(12) United States Patent
Inami et al.

(10) Patent No.: US 8,866,700 B2
(45) Date of Patent: Oct. 21, 2014

(54) MOBILE ELECTRONIC DEVICE

(75) Inventors: Akiko Inami, Daito (JP); Naoya Watanabe, Gifu (JP)

(73) Assignee: Kyocera Corporation, Kyoto (JP)

( * ) Notice: Subject to any disclaimer, the term of this patent is extended or adjusted under 35 U.S.C. 154(b) by 174 days.

(21) Appl. No.: 13/456,528

(22) Filed: Apr. 26, 2012

(65) Prior Publication Data

US 2012/0274541 A1    Nov. 1, 2012

(30) Foreign Application Priority Data

Apr. 26, 2011    (JP) .................................. 2011-098804

(51) Int. Cl.
*G09G 5/00*    (2006.01)
*G06F 1/16*    (2006.01)

(52) U.S. Cl.
CPC ................ *G09G 5/00* (2013.01); *G06F 1/1641* (2013.01); *G06F 1/1624* (2013.01); *G09G 2300/02* (2013.01)
USPC .......................................................... 345/1.3

(58) Field of Classification Search
CPC ... G06F 1/1616; G06F 1/1622; G06F 1/1624; G06F 1/1641; G06F 3/1423; G09G 2300/02; G09G 2300/023; G09G 5/00
USPC .................................................. 345/1.3, 1.1
See application file for complete search history.

(56) References Cited

U.S. PATENT DOCUMENTS 6,151,081 A * 11/2000 Gold et al. .................... 348/756
8,337,304 B2 * 12/2012 Yoshino et al. ................. 463/32
2003/0133515 A1 * 7/2003 Kondo ........................... 375/295
2007/0178952 A1 * 8/2007 Ehara et al. ...................... 463/1
2007/0291041 A1 * 12/2007 Nakai et al. ................... 345/530
2008/0148184 A1 * 6/2008 Davis ............................. 715/810
2009/0298550 A1 * 12/2009 Kang et al. .................... 455/566
2010/0079672 A1 * 4/2010 Bae et al. ...................... 348/565
2010/0259463 A1 * 10/2010 Sip et al. ........................ 345/1.3
2010/0259515 A1 * 10/2010 Kohara ......................... 345/204
2011/0012931 A1 * 1/2011 Abe .............................. 345/671
2011/0187646 A1 * 8/2011 Mahmoud .................... 345/168
2012/0060089 A1 * 3/2012 Heo et al. ...................... 715/702
2012/0098773 A1 * 4/2012 Kobayashi et al. ........... 345/173

FOREIGN PATENT DOCUMENTS

JP    H09-305262 A    11/1997

* cited by examiner

*Primary Examiner* — Tom Sheng

(74) *Attorney, Agent, or Firm* — Procopio, Cory, Hargreaves & Savitch LLP

(57) ABSTRACT

A first cabinet comprising a first display module and a second cabinet comprising a second display module are provided. A switching is allowed between: a first state in which the first cabinet is placed on top of the second display module and the first display module faces outside, and a second state in which the first cabinet and the second cabinet are arranged next to each other and the first display module and the second display module face outside. A first screen to be displayed by the first display module and a second screen to be displayed by the second display module are stored and a screen switching operation is detected. Displaying of the first screen on the first display module is canceled and the second screen is displayed on the first display module, when the screen switching operation is detected in the first state.

18 Claims, 23 Drawing Sheets

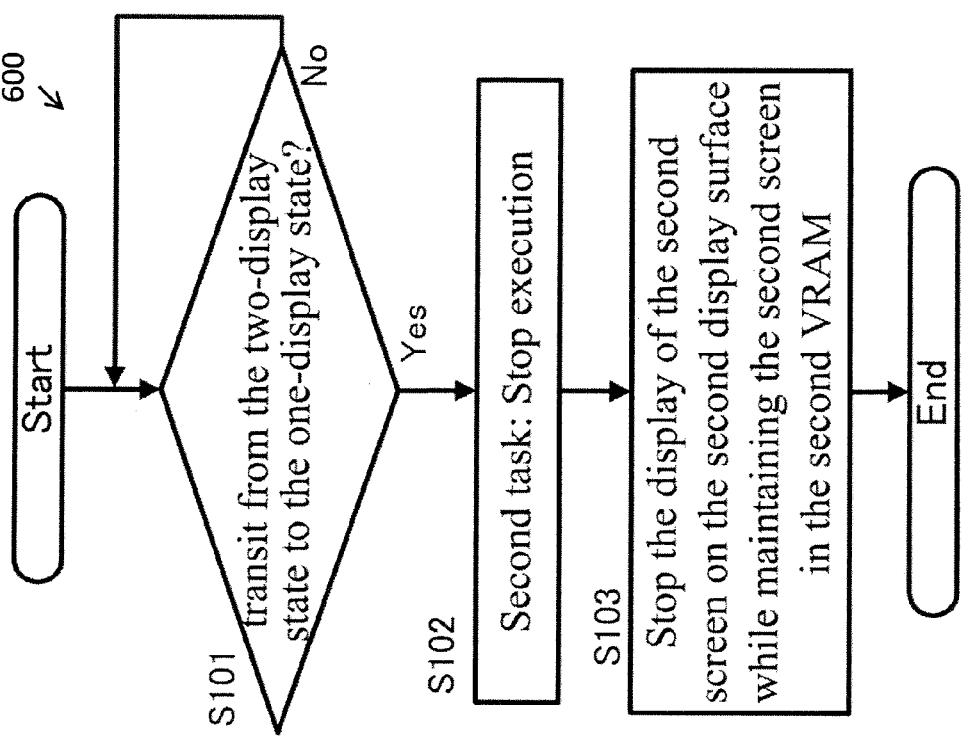

Figure 8A
Figure 8B
Figure 8C
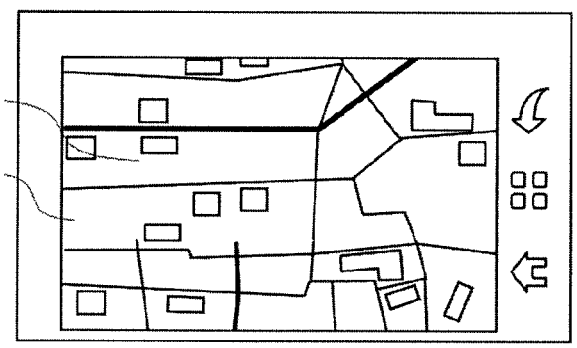
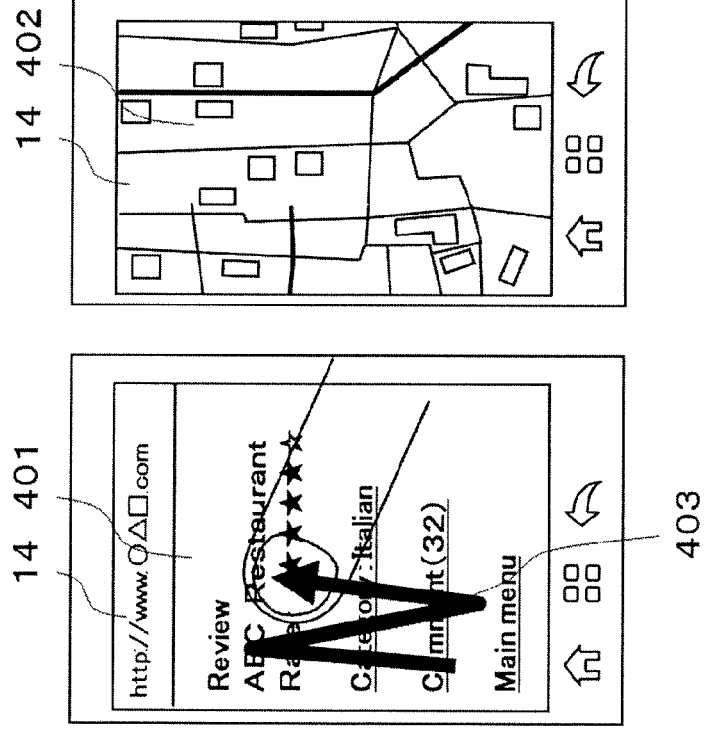

Figure 9C
|  | Before switching screen | After switching screen |
|---|---|---|
| First display | ON | ON |
| Second screen | OFF | OFF |
| Screen memorized to the first VRAM | Web page | Application launching screen |
| Screen memorized to the second VRAM | - | Web page |
| First task | Execution | Execution |
| Second task | Stop | Stop |
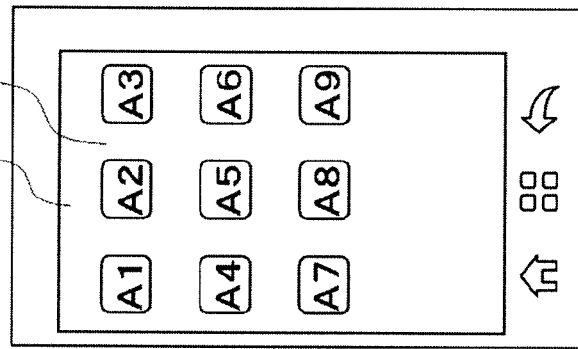
Figure 9B
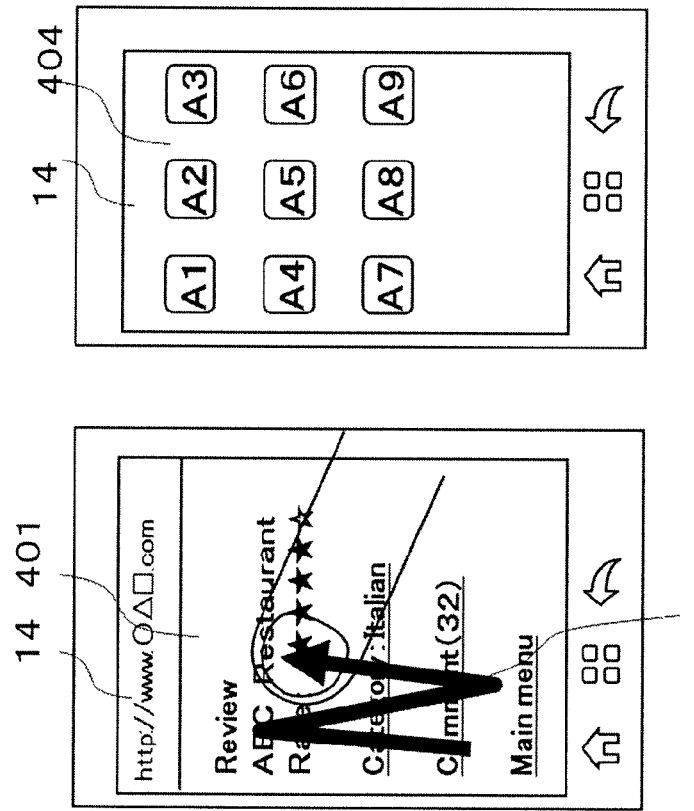
Figure 9A

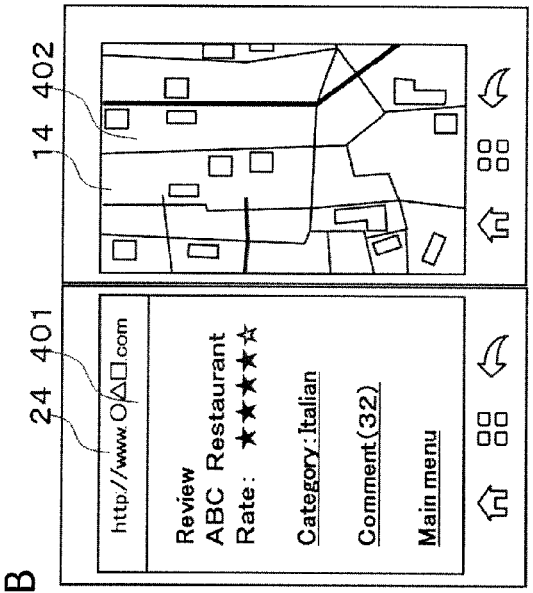
Figure 11B
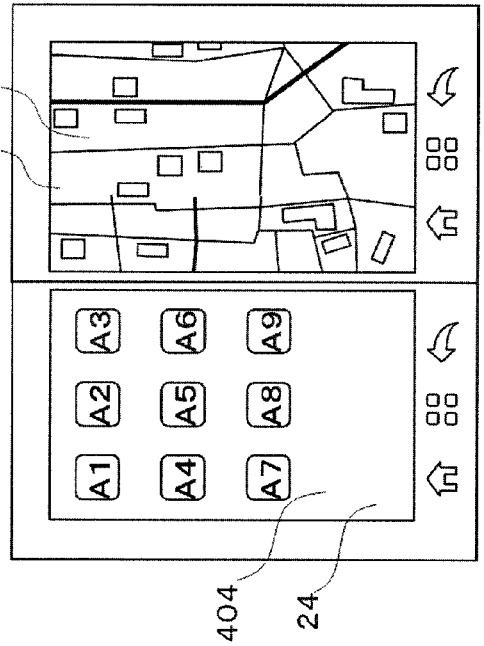
Figure 11D
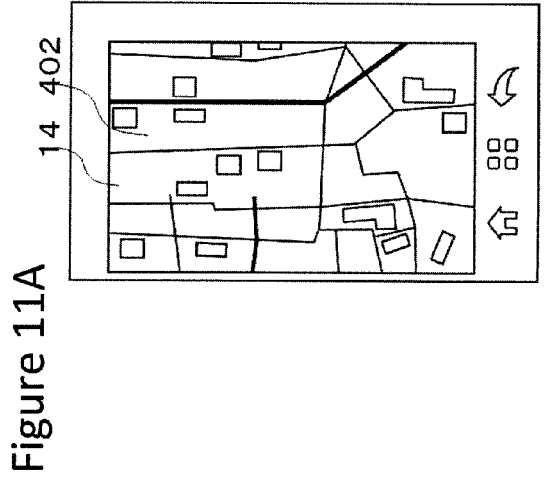
Figure 11A
Figure 11C
| | Before transition (one-screen state) | After transition (two-screen state) |
|---|---|---|
| First screen | ON | ON |
| Second screen | OFF | ON |
| Task of the first screen | Execution | Execution |
| Task of the second screen | Stop | Execution |

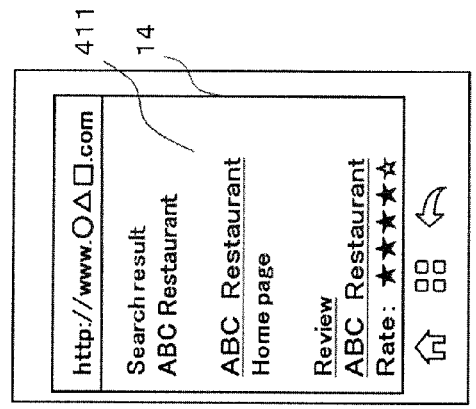
Figure 13A
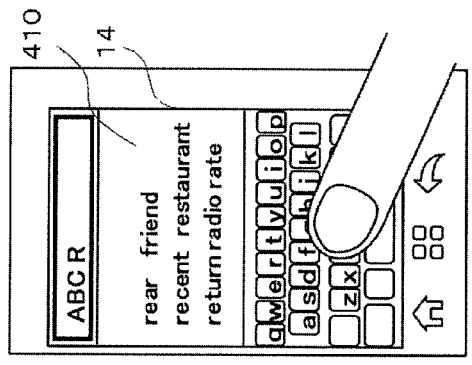
Figure 13B
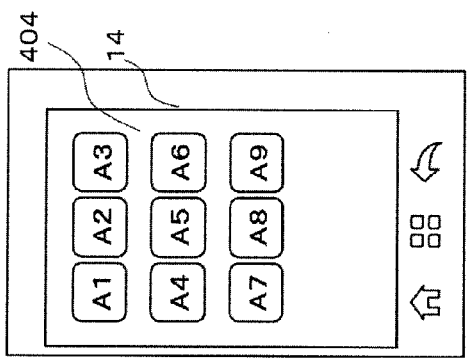
Figure 13C
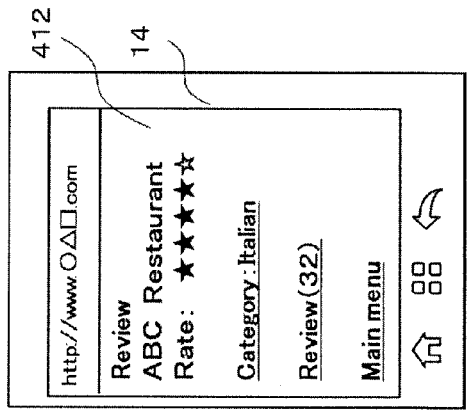
Figure 13D
Figure 13E
The first task list
| Number | Execution process of the tasks |
|---|---|
| 1 | Information showing the final state when task A is conducted |
| 2 | Information showing the final state when task B is conducted |
| 3 | Information showing the final state when task C is conducted |

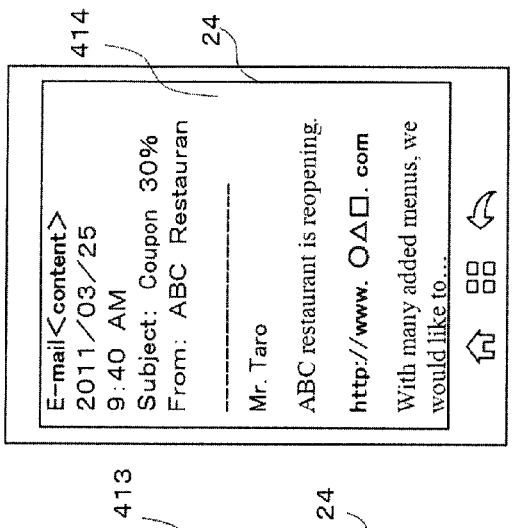
Figure 14A
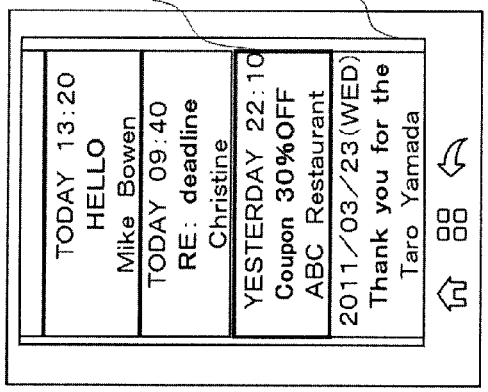
Figure 14B
Figure 14C
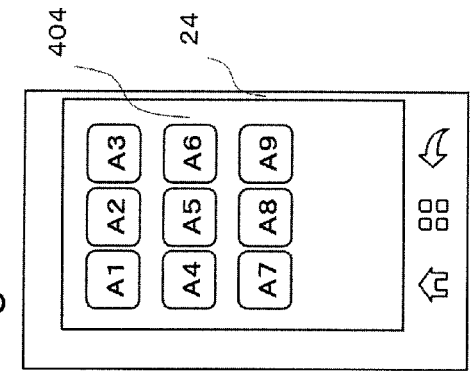
Figure 14D
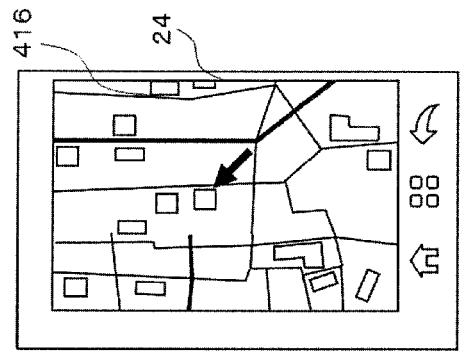
Figure 14E
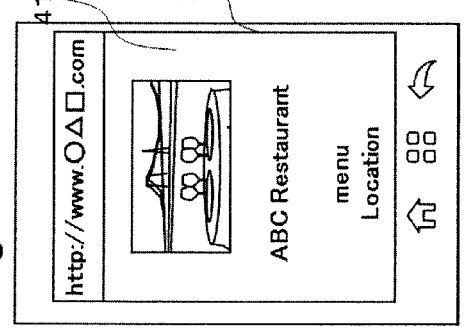
Figure 14F
Second task list
| Number | Execution process of the tasks |
|---|---|
| 1 | Information showing the final state when task D is conducted |
| 2 | Information showing the final state when task E is conducted |
| 3 | Information showing the final state when task F is conducted |
| 4 | Information showing the final state when task G is conducted |

Before switching screens

After switching screens

After pushing back key

Figure 16D    First task list

| Number | Execution process of the tasks |
|---|---|
| 1 | Information showing the final state when task D is conducted |
| 2 | Information showing the final state when task E is conducted |
| 3 | Information showing the final state when task F is conducted |

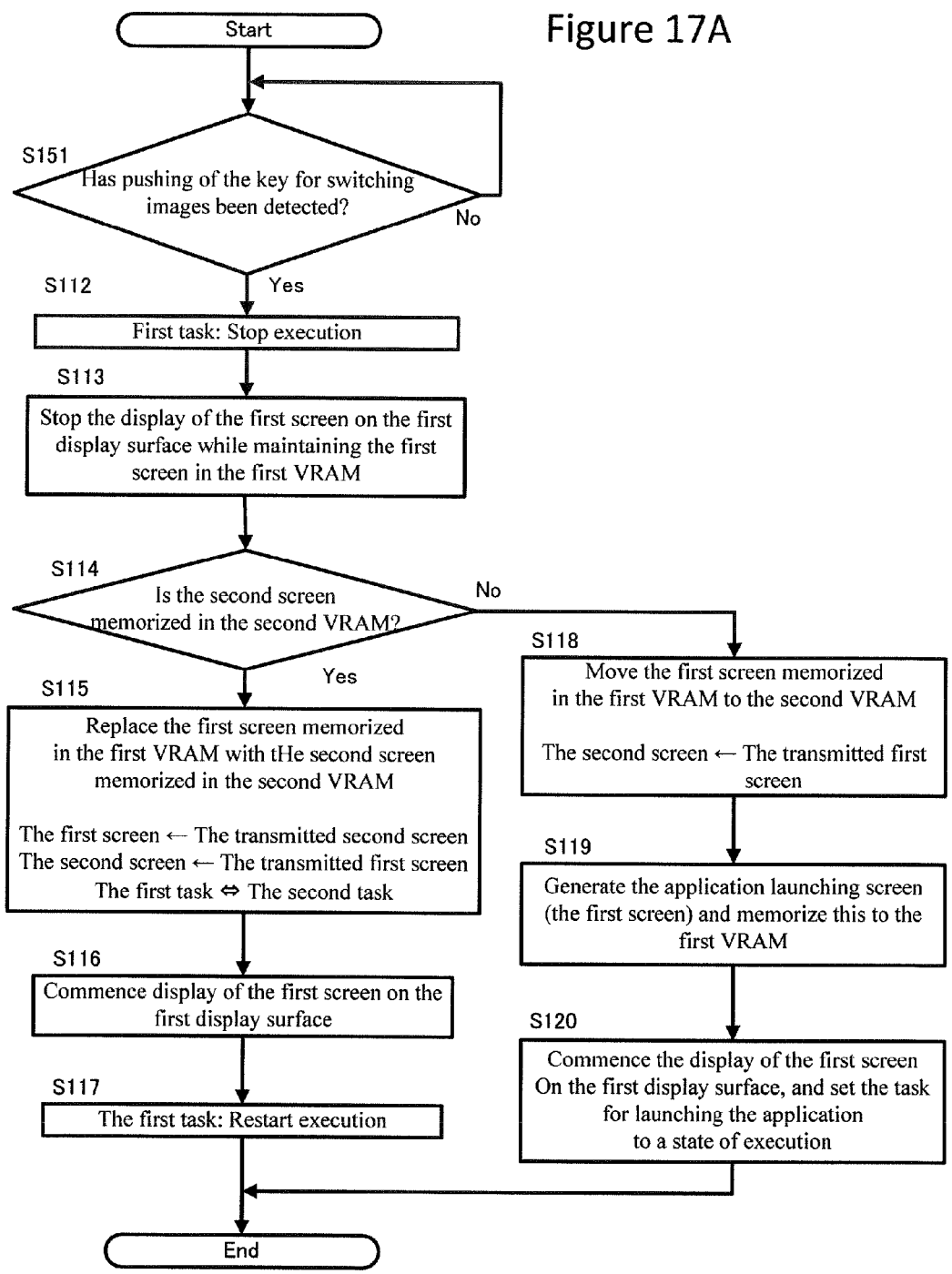

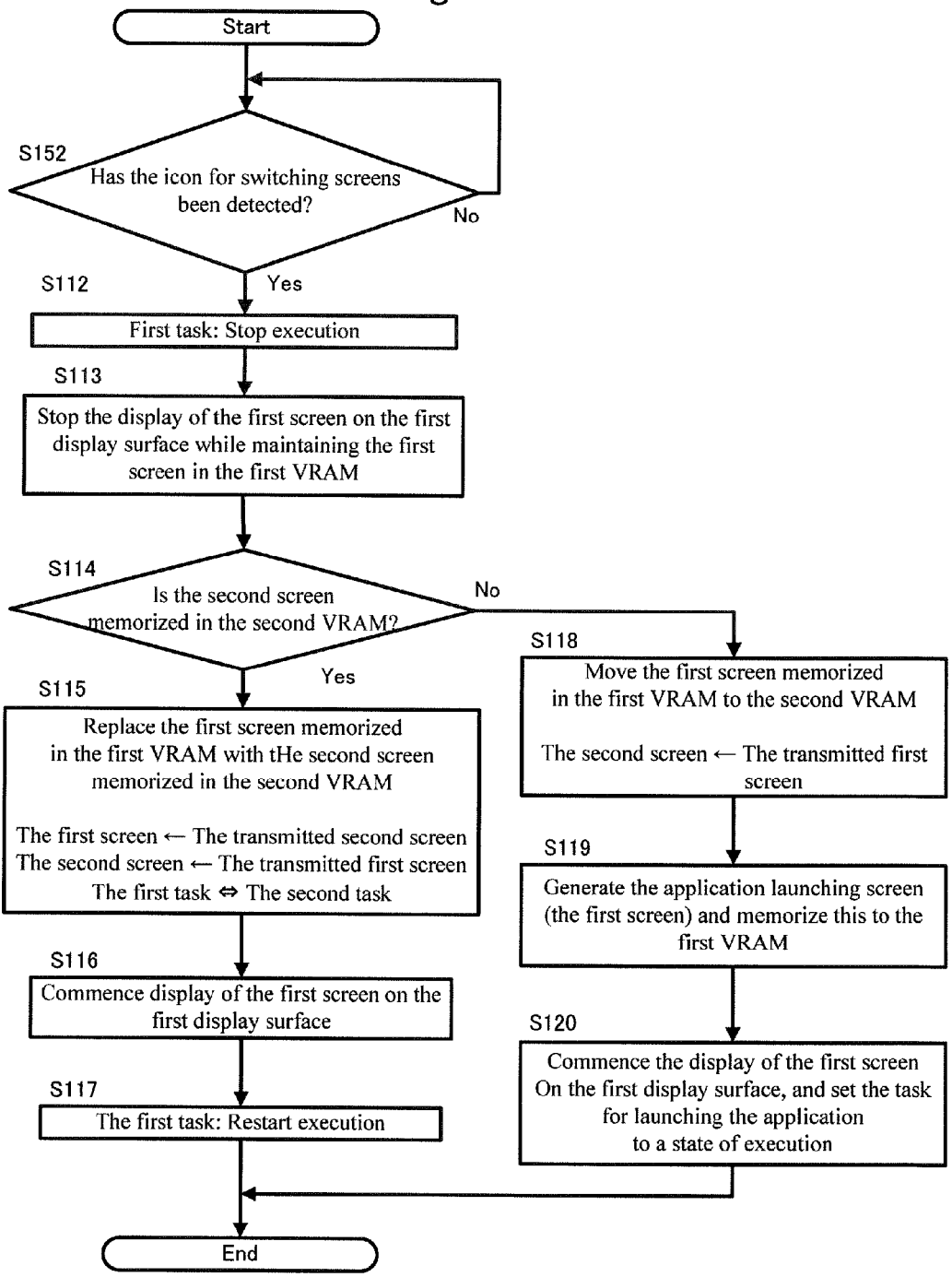

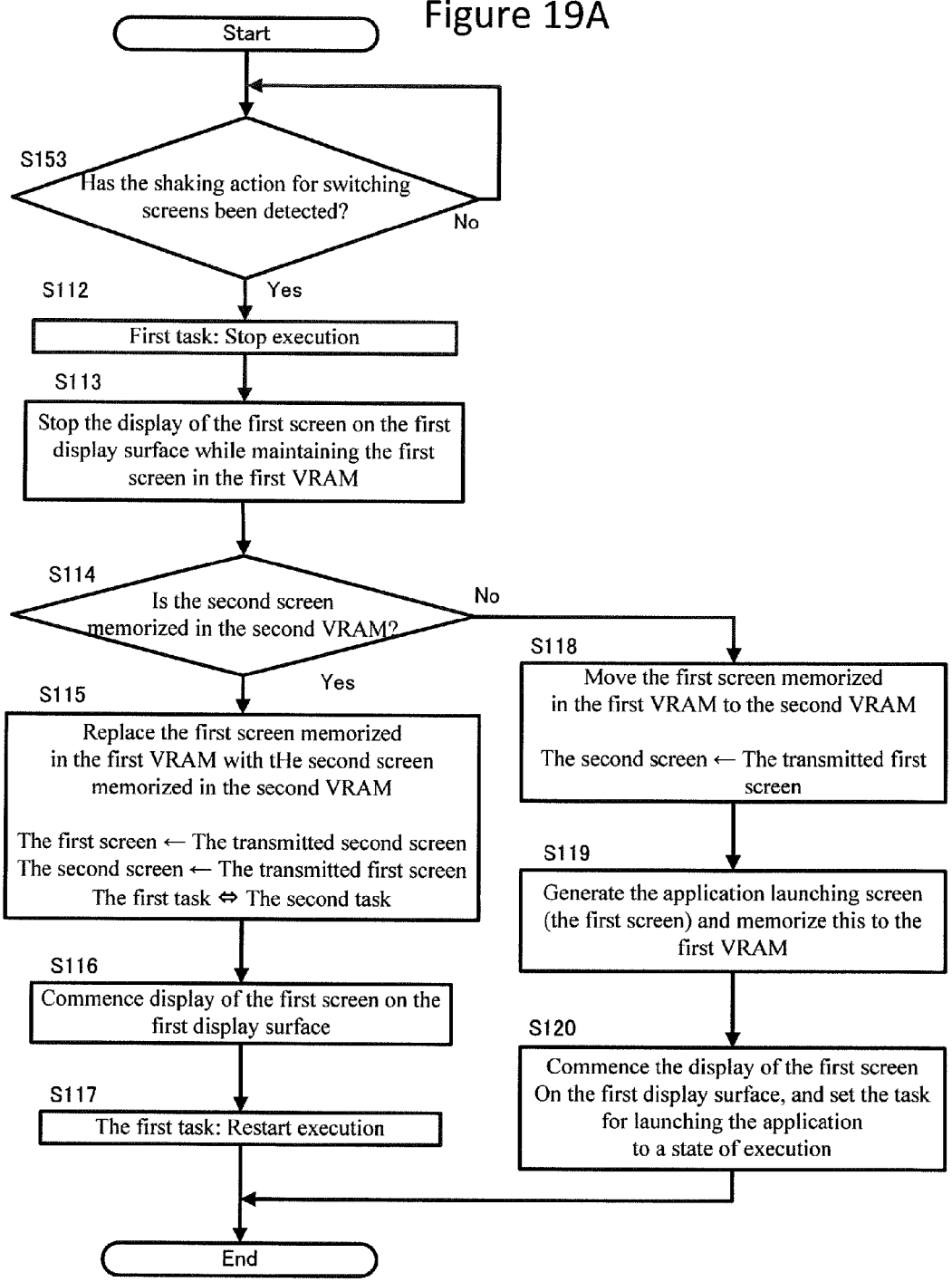

MOBILE ELECTRONIC DEVICE

CROSS-REFERENCE TO RELATED APPLICATION

The present application claims priority under 35 U.S.C. §119 to Japanese Patent Application No. 2011-098804, filed on Apr. 26, 2011, entitled "MOBILE TERMINAL DEVICE and PROGRAM". The content of which is incorporated by reference herein in its entirety.

FIELD

Embodiments of the present disclosure relate generally to mobile electronic devices, and more particularly relate to mobile electronic devices comprising more than one display screen thereon.

BACKGROUND

Some mobile terminal devices comprise two display surfaces. In such mobile terminal devices, there may be a first screen state in which only one display surface of the two display surfaces is arranged facing outside, and a second screen state in which both display surfaces are arranged facing outside. When executing an application program, the user is able to execute the application program in each screen state. However, in the first screen state, the user is unable to use functions executed using the hidden screen. It is desirable to enable the user to easily use functions executed using the hidden screen while maintaining the first screen state.

SUMMARY

A system and methods for operating a mobile electronic device are presented. A first cabinet comprising a first display module, and a second cabinet comprising a second display module are provided. A switching is allowed between: a first state in which the first cabinet is placed on top of the second display module and the first display module faces outside, and a second state in which the first cabinet and the second cabinet are arranged next to each other and the first display module and the second display module face outside. A first screen to be displayed by the first display module and a second screen to be displayed by the second display module are stored and a screen switching operation is detected. Displaying of the first screen on the first display module is canceled and the second screen is displayed on the first display module, when the screen switching operation is detected in the first state.

In an embodiment, a mobile electronic device comprises a first cabinet comprising a first display module, a second cabinet comprising a second display module, supporting section, a memory, a screen-switching-operation detector, and a control module. The supporting section supports the first cabinet and the second cabinet in a manner allowing for switching between: a first state in which the first cabinet is placed on top of the second display module and the first display module faces outside, and a second state in which the first cabinet and the second cabinet are arranged next to each other and the first display module and the second display module face outside. The memory stores a first screen to be displayed by the first display module and a second screen to be displayed by the second display module. The screen-switching-operation detector detects a screen switching operation. The control module cancels displaying of the first screen on the first display module and display the second screen on the first display module, when the screen switching operation is detected in the first state.

In another embodiment, a method for operating a mobile electronic device provides a first cabinet comprising a first display module and, a second cabinet comprising a second display module. The method further, allows for switching between: a first state in which the first cabinet is placed on top of the second display module and the first display module faces outside, and a second state in which the first cabinet and the second cabinet are arranged next to each other and the first display module and the second display module face outside. The method further stores a first screen to be displayed by the first display module and a second screen to be displayed by the second display module and detects a screen switching operation. The method then cancels displaying of the first screen on the first display module and display the second screen on the first display module, when the screen switching operation is detected in the first state.

In a further embodiment, a computer readable storage medium comprising computer-executable instructions for operating a mobile electronic device, allowing for switching between: a first state in which a first cabinet is placed on top of a second display module and a first display module faces outside, and a second state in which the first cabinet and a second cabinet are arranged next to each other and the first display module and the second display module face outside. The method further, stores a first screen to be displayed by the first display module and a second screen to be displayed by the second display module, and detects a screen switching operation. The method further cancels displaying of the first screen on the first display module and display the second screen on the first display module, when the screen switching operation is detected in the first state.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

FIGS. 6A and 6B are illustrations of an exemplary flowchart and a table showing a control process that is conducted when a screen state transitions from a two-screen state to a one-screen state according to an embodiment of the disclosure.

FIGS. 8A to 8C are illustrations of an exemplary display of a screen showing a screen switching process and a table showing a change in status of execution of a task according to an embodiment of the disclosure.

FIGS. 9A to 9C are illustrations of an exemplary display of a screen showing a screen switching process and a table showing a change in status of execution of a task according to an embodiment of the disclosure.

FIGS. 11A to 11D are illustrations of an exemplary display when a screen state transitions from a one-screen state to a two-screen state and a diagram showing a change in status of execution of a task according to an embodiment of the disclosure.

FIGS. 13A to 13E are illustrations of an exemplary display and an exemplary table of a screen showing a first task list related according to an embodiment of the disclosure.

FIGS. 14A to 14F are illustrations of display examples and a table of a screen showing a second task list according to an embodiment of the disclosure.

FIGS. 16A to 16D are illustrations of an exemplary display and an exemplary table showing an operation for switching screens and actions of the screen switching process according to an embodiment of the disclosure.

FIGS. 17A and 17B are illustrations of an exemplary flowchart showing a screen switching process and an exemplary diagram showing a situation in which an operation for switching screens is conducted according to an embodiment of the disclosure.

FIGS. 18A and 18B are illustrations of an exemplary flowchart showing a screen switching process and an exemplary diagram showing a situation in which an operation for switching screens is conducted according to an embodiment of the disclosure.

FIGS. 19A and 19B are illustrations of an exemplary flowchart showing a screen switching process and an exemplary diagram showing a situation in which an operation for switching screens is conducted according to an embodiment of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a mobile electronic device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), personal handy phone system (PHS), lap top computers, TV's, iPod™, iPad™, Global Positioning Systems (GPSs) or navigation systems, health equipment, display monitors, or other electronic device that uses a display screen or a touch panel for displaying information.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

The mobile phone related to the present embodiment comprises two display surfaces: a first display surface and a second display surface. The mobile phone is able to execute various applications in both a first screen state, in which only the first display surface is arranged facing outside, and a second screen state, in which both display surfaces are arranged facing outside. When the screen state is switched from the second screen state to the first screen state, the display of the screen that was displayed on the second display surface is cancelled, and tasks that were being executed using the second display surface are suspended.

The second screen state corresponds to the "open state" and the "tilted state" of the following embodiments, while the first screen state corresponds to the "closed state" of the following embodiments.

Figure 1B:
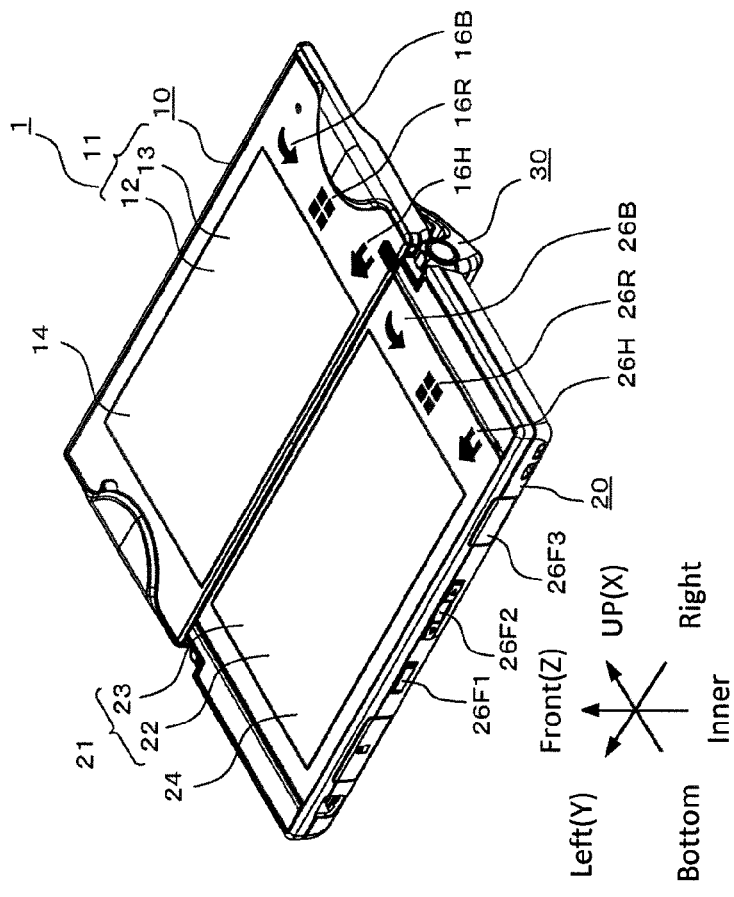
FIGS. 1A to 1D are illustrations of diagrams showing an exemplary external view and an exemplary cross-sectional view of a mobile phone in a closed state and an open state according to an embodiment of the disclosure.

FIGS. 1A to 1D are illustrations of diagrams showing an exemplary external view and an exemplary cross-sectional view of a mobile phone 1 in a closed state and an open state according to an embodiment of the disclosure. FIGS. 2A and 2B are illustrations of diagrams showing an exemplary external view of the mobile phone 1 in a tilted state according to an embodiment of the disclosure.

Figure 1A:
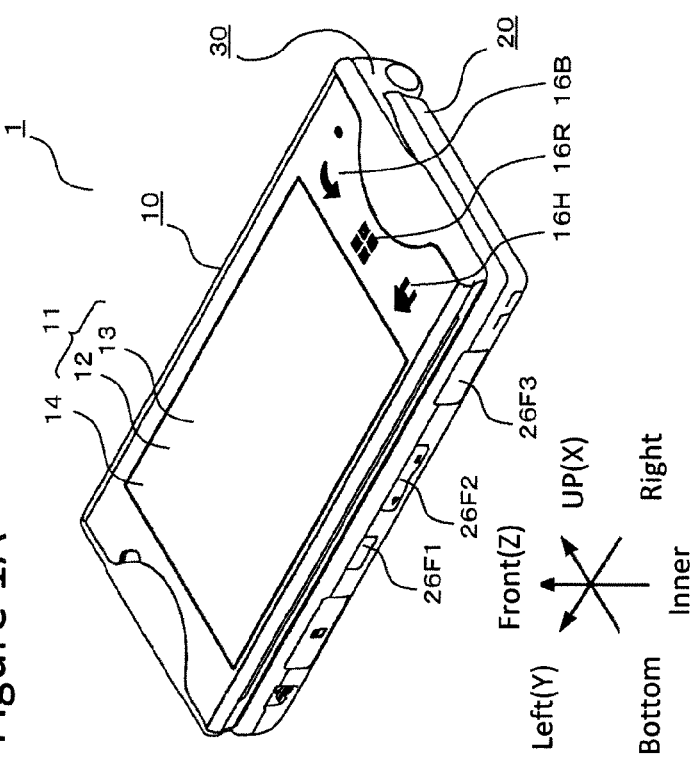
Figure 1D:
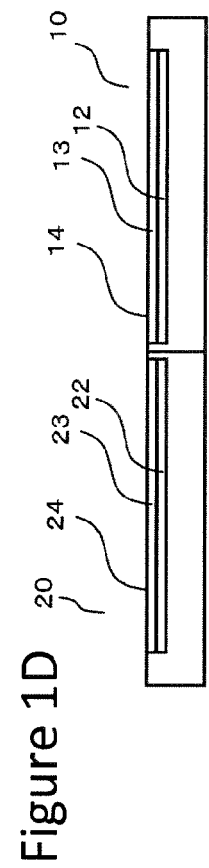
Figure 1C:
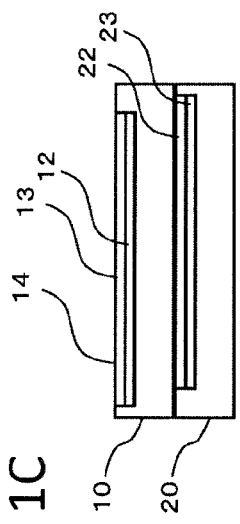
Figure 2B:
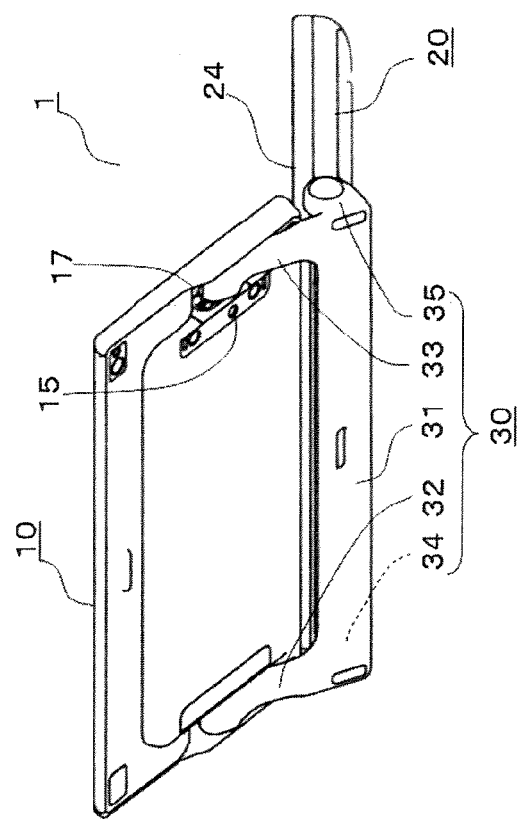
FIGS. 2A and 2B are illustrations of diagrams showing an exemplary external view of a mobile phone in a tilted state according to an embodiment of the disclosure.
Figure 2A:
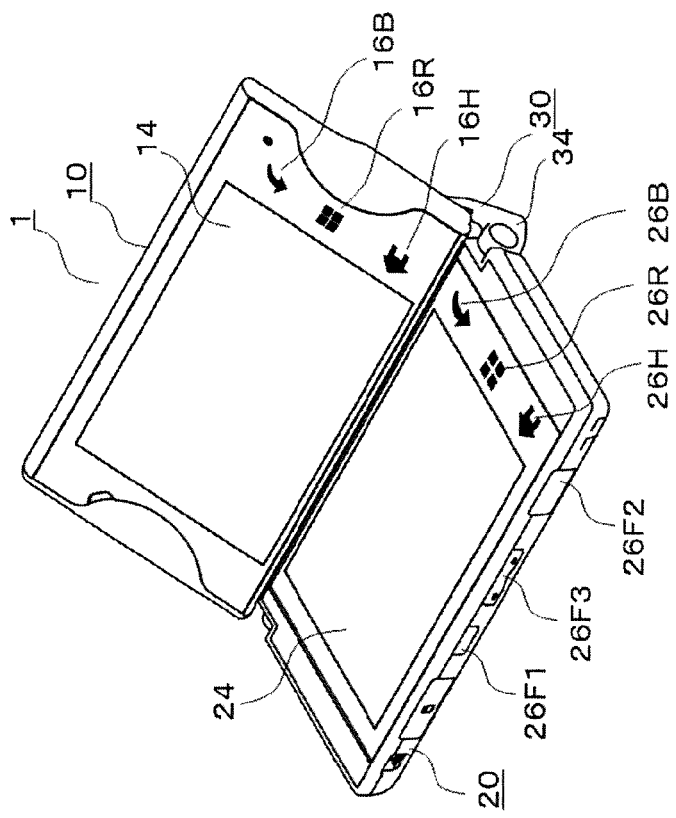

FIG. 1A is a perspective diagram shows a configuration of the mobile phone 1 in the closed state. FIG. 1B is a perspective diagram showing a configuration of the mobile phone 1 in an open state. FIG. 1C is an internal perspective view of the mobile phone 1 of FIG. 1A when viewed from a right side. FIG. 1D is an internal perspective view of the mobile phone 1 of FIG. 1B when viewed from the right side.

FIG. 2A is a perspective diagram of the mobile phone 1 in the tilted state when viewed from a near side of a first cabinet 10. FIG. 2B is a perspective diagram of the mobile phone 1 in the tilted state when viewed from a far side of a first cabinet 10.

With reference to FIG. 1, the mobile phone 1 comprises the first cabinet 10, a second cabinet 20, and a connection 30 that connects the first cabinet 10 and the second cabinet 20.

Hereinafter, the directions "right", "left", "up", "down", "near", and "far" in relation to the mobile phone 1 are set as shown in FIGS. 1A and 1B. The forward directions of the X-axis, Y-axis, and Z-axis correspond to upwards, leftwards, and the nearside directions, respectively. The "front surfaces"

of the first cabinet 10 and the second cabinet 20 are the surfaces on the near sides of the first cabinet 10 and the second cabinet 20, respectively. The "rear surfaces" of the first cabinet 10 and the second cabinet 20 are the surfaces on the far sides of the first cabinet 10 and the second cabinet 20, respectively.

The closed state is a state in which the first cabinet 10 is arranged to overlap the front surface of the second cabinet 20. The open state is a state in which the first cabinet 10 is lined up above the second cabinet 20.

The first cabinet 10 may comprise a flat rectangular parallelepiped shape extending leftwards and rightwards. A first touch panel 11 may be arranged on the front surface of the first cabinet 10. The first touch panel 11 comprises a first display 12 (first display module 12) and a first touch sensor 13.

The first display 12 may comprise a liquid crystal display, and comprises a liquid crystal panel, a backlight, and a driver circuit that drives these components (not illustrated). As a result of the driver circuit driving the liquid crystal panel and the backlight based on screen signals and control signals received from a display control device (described below), the screen displayed on the liquid crystal panel is rendered and the backlight is turned on. As a result, via the first display surface 14 that is the outer surface of the first touch panel 11, the user is able to view the screen (first screen) that has been rendered. Hereinafter, the screen display on the first display surface 14 is referred to as the "first screen".

The first touch sensor 13 may comprise a transparent, rectangular sheet and is arranged overlapping the first display 12. When a user enters an input on the first display surface 14 (i.e., when the user touches the first display surface 14), the first touch sensor 13 detects the position (input position) on the first display surface 14 that is touched. The first touch sensor 13 outputs position signals corresponding to the detected input position.

The user "touching" the first display surface 14 refers to the user touching the first display surface 14 with a contact member such as a finger, pen, and the like. A "touch" is carried out when the user pushes, strokes, or draws figures or letters on the first display surface 14 using the contact member. The user "tapping" the first display surface 14 refers to an action of touching with the contact member in a location with the first display surface 14 so as to flick the first display surface 14 with the contact member or the finger and release it within a short period of time. The user "sliding" the first display surface 14 refers to an action of the user moving the contact member or the finger along the first display surface 14 while still touching the first display surface 14.

A lens window 15 (FIG. 2B) for capturing moving pictures and still images is arranged on the left side of the rear surface of the first cabinet 10.

A key group 16 is arranged on the front surface of the first cabinet 10. The key group 16 comprises, among others: a Home key 16H for displaying a home screen on the first display surface 14; a Back key 16B for returning the screen displayed on the first display surface 14 to the immediately previous screen during the execution of an application; and a Launcher key 16R for displaying an application startup screen (launcher screen) comprising icons for starting up applications on the first display surface 14.

The Home key 16H, the Back key 16B, and the Launcher key 16R are touch keys. When any one of the Home key 16H, the Back key 16B, and the Launcher key 16R is touched using a finger or the like, a touch sensor (not illustrated) provided in a key input circuit (described below) detects the touch operation and outputs signals corresponding to the key that was touched.

The second cabinet 20 comprises a flat rectangular parallelepiped shape extending leftwards and rightwards. A second touch panel 21 is arranged on the front surface of the second cabinet 20. The second touch panel 21 comprises a second display 22 (second display module 22) and a second touch sensor 23.

The configuration of the second display 22 is almost identical to the configuration of the first display 12. The second display 22 is a liquid crystal display and comprises a liquid crystal panel, a backlight, and a driver circuit that drives these components (not illustrated). As a result of the driver circuit driving the liquid crystal panel and the backlight based on screen signals and control signals received from a display control device (described later), the liquid crystal panel renders a screen and the backlight is turned on. As a result, via the second display surface 24 that is the outer surface of the second touch panel 21, the user is able to view the screen (second screen) that has been rendered. Hereinafter, the screen display on the second display surface 24 is referred to as the "second screen".

The second touch sensor 23 comprises a transparent, rectangular sheet and is arranged overlapping the second display 22. When the user touches the second display surface 24, the second touch sensor 23 detects the position (input position) on the second display surface 24 that was touched. The second touch sensor 23 outputs position signals corresponding to the detected input position.

A key group 26 is arranged on the front surface and lateral surface of the second cabinet 20. The key group 26 comprises, among others: a Home key 26H for displaying a home screen on the second display surface 24; a Back key 26B for returning the screen displayed on the second display surface 24 to the immediately previous screen during the execution of an application; and a Launcher key 26R for displaying an application startup screen (launcher screen) comprising icons for starting up applications on the second display surface 24. The Home key 26H, the Back key 26B, and the Launcher key 26R are touch keys. When any one of the Home key 26H, the Back key 26B, and the Launcher key 26R is touched using a finger or the like, a touch sensor (not illustrated) provided in the key input circuit (refer to FIG. 4) detects the touch operation and outputs position signals corresponding to the key that was touched.

The key group 26 further comprises function keys 26F1, 26F2, 26F3 arranged on the lower lateral surface of the second cabinet 20. The function keys 26F1, 26F2, 26F3 are keys for starting up prescribed applications or for volume adjustment (or other various functions) during the execution of an application. When the function keys 26F1, 26F2, 26F3 are pressed, the key input circuit (refer to FIG. 4) detects this pressing and outputs signals corresponding to the key that was pressed.

With reference to FIG. 1C, in the closed state, only the first display surface 14 faces outside from among the first and second display surfaces 24. The second display surface 24 is arranged to the rear of the first cabinet 10 and does not face outside. With reference to FIG. 1(d), in the open state, the first and second display surfaces 24 face outside from the front surface side of the mobile phone 1.

In the open state, the lower boundary of the first display surface 14 is located close to the lower lateral surface (a few millimeters) of the first cabinet 10. In the same manner, the upper boundary of the second display surface 24 is located close to the upper lateral surface (a few millimeters) of the second cabinet 20. Thus, there is a small gap between the first display surface 14 and the second display surface 24 in the closed state; consequently, the user may recognize the first display surface 14 and the second display surface 24 as one integrated display surface.

In the tilted state shown in FIGS. 2A and 2B, the first cabinet 10 is arranged lined up above the second cabinet 20. However, in contrast to the open state, the respective front surfaces of the first cabinet 10 and the second cabinet 20 in the tilted state are arranged to have a prescribed obtuse angle (e.g., around one hundred and several tens of degrees) as shown in FIGS. 2A and 2B.

The connection 30 (supporting section 30) comprises a central frame 31, a first right frame 32, a first left frame 33, a second right frame 34, and a second left frame 35. The central frame 31 has a shape extending to the left and right. The right end of the central frame 31 is connected to one end of the first right frame 32 and one end of the second right frame 34. The left end of the central frame 31 is connected to one end of the first left frame 33 and one end of the second left frame 35.

Axes (not illustrated) each extending leftwards and rightwards are arranged on the other ends of the first right frame 32 and the first left frame 33. These axes are sandwiched by grooves 17 arranged on the left and right lateral surfaces of the first cabinet 10. In FIG. 2, only the groove 17 of the left lateral surface is illustrated. As a result of these axes being maintained by the first cabinet 10 in a manner allowing for sliding along the grooves 17, the first cabinet 10 is maintained by the first right frame 32 and the first left frame 33 in a manner allowing for rotation about the axes and sliding in the upward and downward directions along the grooves 17.

The second right frame 34 and the second left frame 35 rotatably maintain the second cabinet 20 with the horizontal direction as the axis.

As described below with reference to FIGS. 3A through 3F, the connection 30 maintains the first cabinet 10 and the second cabinet 20 in a manner allowing for switching between the open state and the closed state via the tilted state. The user is able to manually transition between states of use of the mobile phone 1.

FIGS. 3A to 3F are illustrations of exemplary diagrams showing the mobile phone 1 changing from a closed state to an open state according to an embodiment of the disclosure.

FIGS. 3A through 3F are explanatory diagrams of the process by which the screen state of the mobile phone 1 transitions from the closed state (FIG. 3A) through the tilted state (FIG. 3D) and to the open state (FIG. 3F), when the mobile phone 1 is viewed from the right side.

Figure 3A:
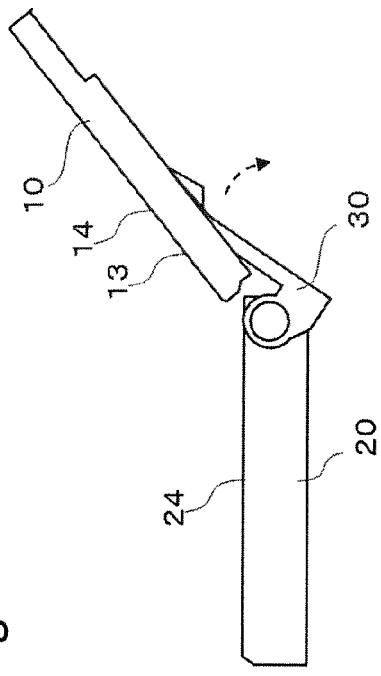
FIGS. 3A to 3F are illustrations of exemplary diagrams showing a mobile phone changing from a closed state to an open state according to an embodiment of the disclosure.
Figure 3B:
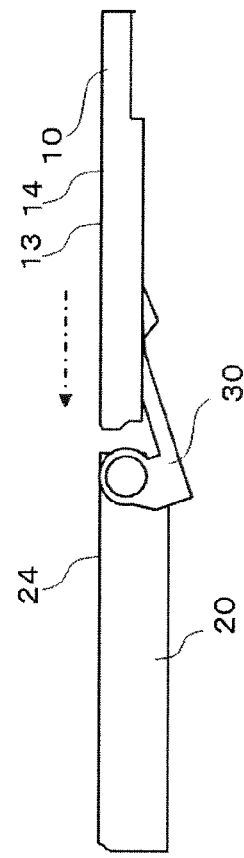

When the mobile phone 1 is in the closed state as shown in FIG. 3A, if the first cabinet 10 is moved in the nearside direction (in the direction of the broken arrow in FIG. 3A), as shown in FIG. 3B, the rear surface of the first cabinet 10 is separated from the front surface of the second cabinet 20. As the first cabinet 10 moves, the connection 30 is rotated in the clockwise direction (in the direction of the solid arrow).

Figure 3C:
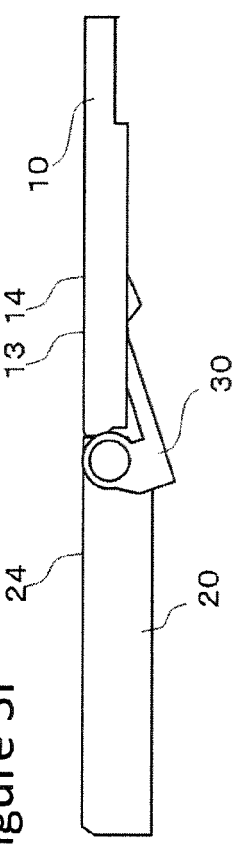
Figure 3D:
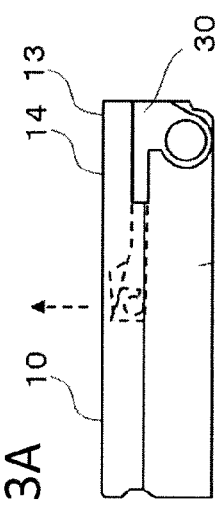

In the state shown in FIG. 3B, when the first cabinet is moved further in the nearside direction and the first display surface 14 is rotated to face downward (in the direction of the broken arrow), the state of the mobile phone 1 goes through the arrangement state of FIG. 3C and reaches the tilted state of FIG. 3D. In the tilted state, the lower side of the rear surface of the first cabinet 10 abuts the connection 30.

Figure 3E:
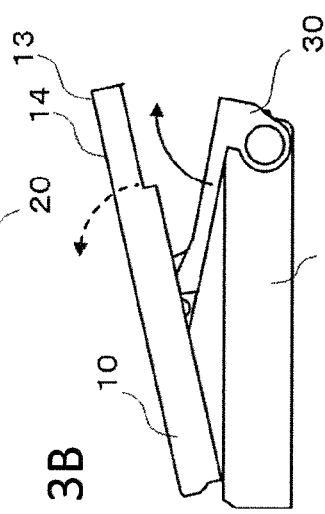

When the connection 30 is rotated further in the clockwise direction (in the direction of the broken arrow in FIG. 3D) while maintaining the state in which the lower side of the rear surface of the first cabinet 10 abuts the connection 30, the mobile phone 1 reaches the state shown in FIG. 3(e) in which the first display surface 14 and the second display surface 24 become almost one surface.

Figure 3F:
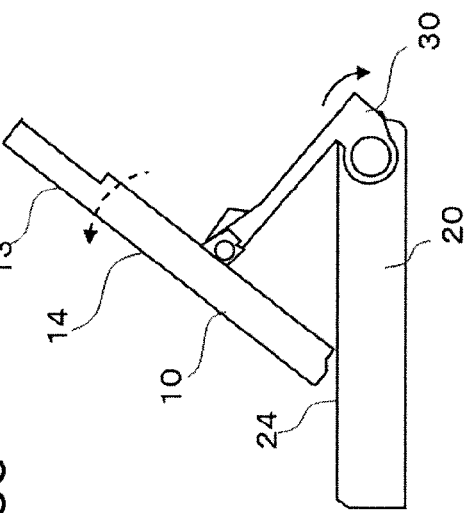

In FIG. 3E, there is a gap (about a few millimeters) between the first cabinet 10 and the second cabinet 20. When the first cabinet 10 is slide in the downward direction (in the direction of the dashed arrow) relative to the second cabinet 20, as shown in FIG. 3F, the mobile phone 1 reaches the open state. At this time, the lower lateral surface of the first cabinet 10 and the upper lateral surface of the second cabinet 20 come into contact with each other.

When the mobile phone 1 is in the titled state shown in FIG. 3D (i.e., when the first right frame 32 and the first left frame 33 form a prescribed obtuse angle with the second cabinet 20), the connection 30 has a structure to weakly lock the rotation of the connection 30. Because the rotation is weakly locked, the user is able to use the mobile phone 1 while maintaining the tilted state, and is also able to easily change the state of use from the tilted state to either the open state or the closed state.

Figure 4:
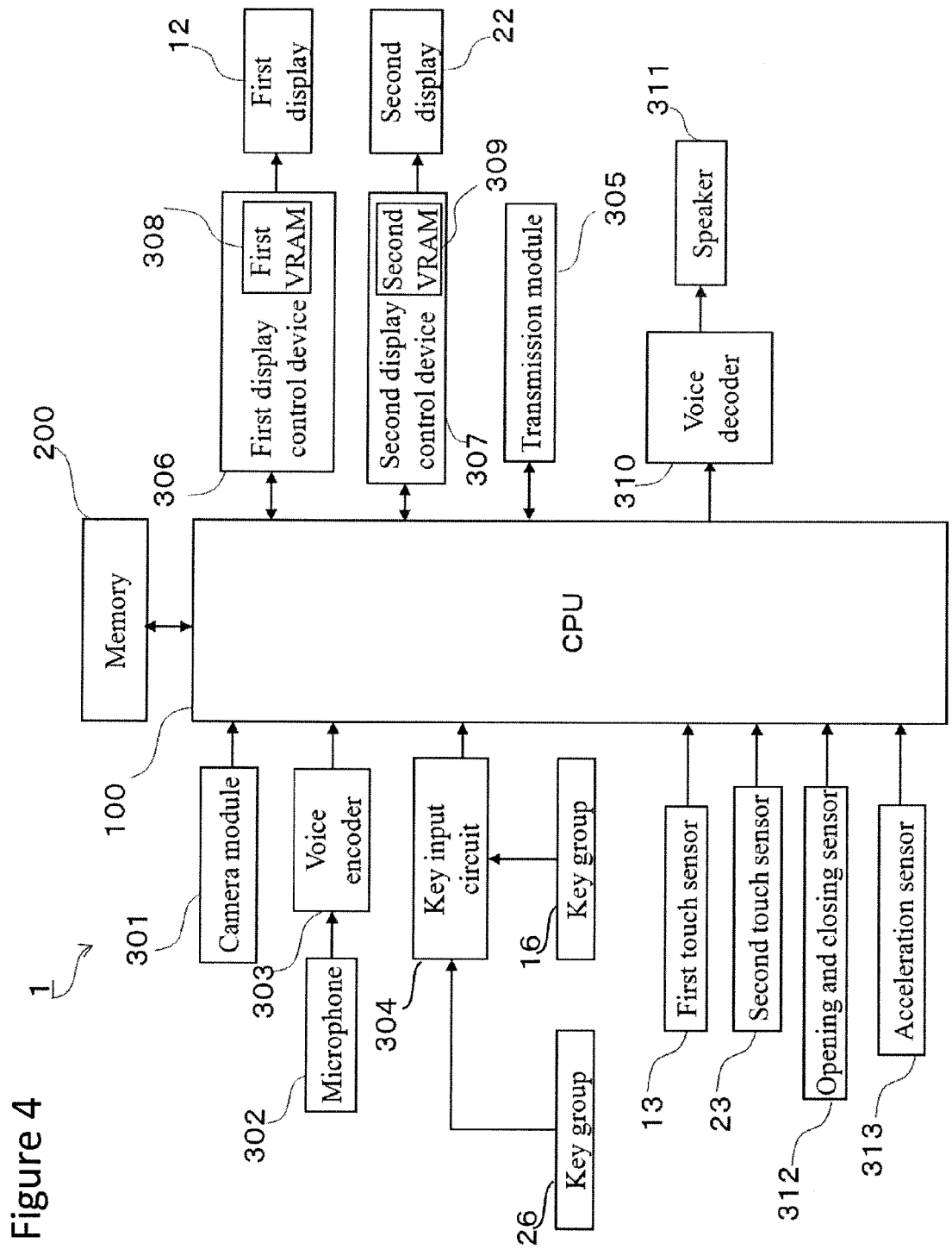
FIG. 4 is an illustration of an exemplary functional block diagram of a mobile phone according to an embodiment of the disclosure.

FIG. 4 is an illustration of an exemplary functional block diagram of the mobile phone 1 according to an embodiment of the disclosure.

In addition to the various components described above, the mobile phone 1 of the present embodiment comprises a CPU 100, a memory 200, a camera module 301, a microphone 302, a voice encoder 303, a key input circuit 304, a communication module 305, a first display control device 306, a second display control device 307, a first VRAM 308, a second VRAM 309, a voice decoder 310, a speaker 311, an opening and closing acceleration sensor 312, and an acceleration sensor 313.

The camera module 301 is arranged on the first cabinet 10. The camera module 301 captures images via the lens window 15, and generates digital imaging signals using a video encoder (not illustrated) built into the camera module 301. The camera module 301 outputs the generated imaging signals to the CPU 100.

The microphone 302 is arranged in the first cabinet 10. The microphone 302 converts the collected sound to a voice signal and outputs this to the voice encoder 303. The voice encoder 303 converts the analog voice signal from the microphone 302 to a digital voice signal and outputs the converted digital voice signal to the CPU 100.

When any of the keys of the key groups 16, 26 is pressed, the key input circuit 304 outputs signals corresponding to the key that has been pressed to the CPU 100.

The communication module 305 comprises an antenna (not illustrated) that transmits and receives radio waves for calls and communication. The communication module 305 converts signals input from the CPU 100 into wireless signals and transmits the converted wireless signals via the antenna to a communication destination such as a base station or another communication device. The communication module 305 converts wireless signals received via the antenna into signals in a format that can be used by the CPU 100 and outputs the converted signals to the CPU 100.

The first display control device 306 and the second display control device 307 control the first display 12 and the second display 22, respectively. The first display control device 306 and the second display control device 307 each may comprise a Liquid Crystal Display (LCD) controller. The first display control device 306 and the second display control device 307 respectively comprise a first VRAM 308 and a second VRAM 309 that store screens.

The first display control device 306 generates data (hereinafter, this data is referred to as "first screen data") for screen display based on image data input from the CPU 100, and stores the generated first screen data in the first VRAM 308 based on control signals input from the CPU 100. The first VRAM 308 stores image data of multiple screens (e.g., for several screens). The first display control device 306 outputs the image data to be displayed that is stored in the first VRAM 308 to the driver circuit of the first display 12 at a predetermined time interval (e.g., around several tens of times per second).

The second display control device 307 comprises the same configuration as the first display control device 306. That is, the second display control device 307 causes the second VRAM 309 to store multiple items of screen data based on control signals and image data input from the CPU 100. The second display control device 307 outputs the image data to be displayed that is stored in the second VRAM 309 to the driver circuit of the second display 22 at a prescribed time interval (e.g., around several tens of times per second).

The first display 12 and the second display 22 may be another flat-screen display device, such as a Light-emitting diode (LED) display, or the like.

The voice decoder 310 performs a decoding process and Digital to Analog (D/A) conversion on audio signals from the CPU 100 and outputs the converted signals to the speaker 311. The speaker 311 outputs audio based on the signals input from the voice decoder 310.

The opening and closing sensor 312 detects the screen state and outputs digital signals corresponding to the screen state to the CPU 100. The opening and closing acceleration sensor 312 has a built-in magnetic sensor (not illustrated) for detecting changes in the angle of the connection 30 relative to the second cabinet 20 in the first screen state (closed state) and the second screen state (open state, tilted state). The magnetic sensor is arranged to detect rotations of the axis part that connects the second cabinet 20 and the connection 30. The CPU 100 executes a process to detect whether the current screen state is the first screen state or the second screen state based on signals from the operating and closing sensor 312.

Instead of a magnetic sensor, the opening and closing acceleration sensor 312 may comprise an angle sensor that detects the angle of rotation of the above axis part.

When the CPU 100 as a screen-switching-operation detector detects that the screen state has transitioned from the second screen state to the first screen state, it controls the second display 22 via the second display control device 307 to stop the rendering of the second screen and turn off the backlight. When CPU 100 detects that the screen state has transitioned from the first screen state to the second screen state, based on the functions being executed, the CPU 100 controls the second display 22 via the second display control device 307 to start rendering the second screen and turn on the backlight of the second display 22.

The acceleration sensor 313 is arranged on the second cabinet 20 and detects the acceleration of the mobile phone 1. The acceleration sensor 313 is a three-axis acceleration sensor and detects acceleration generated in the three directions of the X-axis direction, the Y-axis direction, and the Z-axis direction shown in FIG. 1. The acceleration sensor 313 outputs acceleration signals corresponding to the detected acceleration to the CPU 100. Based on the acceleration signals from the acceleration sensor 313, the CPU 100 detects whether the orientation of the mobile phone 1 is the horizontal orientation or the vertical orientation. When the state of use is the tilted state, using the orientation of the second cabinet 20 on which the acceleration sensor 313 is arranged, the CPU 100 detects whether the orientation of the mobile phone 1 is the horizontal orientation or the vertical orientation.

When the upward and downward directions of FIGS. 1A and 1B are the horizontal directions, the orientation of the mobile phone 1 is detected as being the "vertical orientation", and when leftwards and rightwards of FIGS. 1A and 1B are the horizontal directions, the orientation of the mobile phone 1 is detected as being the "horizontal orientation."

The memory 200 may be any suitable data storage area with suitable amount of memory that is formatted to support the operation of an electronic device such as the mobile phone 1. The memory 200 is configured to store, maintain, and provide data as needed to support the functionality of the mobile phone 1 in the manner described below. In practical embodiments, the memory 200 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory 200 stores a control program providing a control function to the CPU 100.

The memory 200 stores control programs for assigning control functions to the CPU 100 as well as various applications. The memory 200 is also used as a working memory that stores various data that is temporarily used or generated during the execution of applications. Each application comprises data for image generation and tasks (described later) assigned to each screen.

In addition to these control programs and applications, the memory 200 stores, among other items and in prescribed file formats, information input from the first and second touch sensors 13, 23, the addresses of screen stored in the first and second VRAMs 308, 309, the state of execution of applications or tasks (described later) for which execution has been temporarily stopped, and a task list (described later) that is a history of screens displayed on the first display surface 14 and the second display surface 24.

The CPU 100 is configured to support functions of an electronic device such as the mobile phone 1. For example, in accordance with the control programs, the CPU 100 operates the camera module 301, the microphone 302, the communication module 305, the first display 12, the second display 22, the speaker 311, and the like. In this way, the CPU 100 executes various applications such as calls, camera functions, E-mail, web browsers, maps, music players, and the like.

When the screen state is in the closed state, the CPU100 turns off the back light of the second display 22. When the screen state is in the open state or tilted, the CPU100 turns on the back light of the second display 22.

The CPU 100, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

During the execution of an application, the CPU 100 displays screens on each display surface and executes tasks corresponding to each displayed screen. Here, a "task" refers to a program that executes a prescribed process as a result of inputs made on the displayed screens. Hereinafter, a task corresponding to the first screen displayed on the first display surface 14 is referred to as a "first task", and a task corresponding to the second screen displayed on the second display surface 24 is referred to as a "second task."

The following are examples of tasks. For example, during the execution of an online search application, a screen comprising input search keywords and a soft keyboard for inputting keywords is displayed. This screen is assigned with tasks such as a task that displays characters in the search keyword field when characters are input, as well as a task that executes a search when a search-execution button on the screen is pressed.

During the execution of a web browser application, a screen of the corresponding website is displayed. This screen is assigned with a task for accepting inputs of scrolling operations on the screen and operations and the like for displaying a webpage that has been linked and executing corresponding processes. When the user selects link text on the screen, the screen of the link destination is displayed and tasks assigned to the displayed screen can be executed. When the user presses the Back key (16B, 26B), the CPU 100 as a control module cancels the display of the current screen, displays the immediately previous screen, and makes it possible to execute tasks corresponding to this screen again.

During the execution of an E-mail application, screens such as a screen for listing received E-mails, a screen for browsing the content of a selected E-mail, and a screen for creating the content of an E-mail are displayed, and tasks corresponding to each of these screens can be executed.

When a task of a prescribed screen accepts an input to shift to another screen, the task designates a task corresponding to the other screen. Then, the designated task enters an executable state and a screen associated with the task is displayed.

Embodiment 1

Figure 5B:
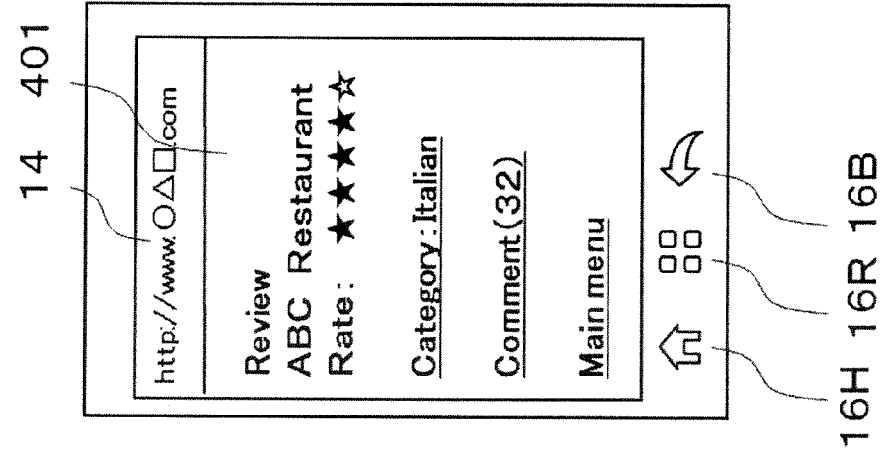
FIGS. 5A and B are illustrations of exemplary execution screen of an application program (hereinafter referred to as an "application") in a two-screen state and a one-screen state according to an embodiment of the disclosure.
Figure 5A:
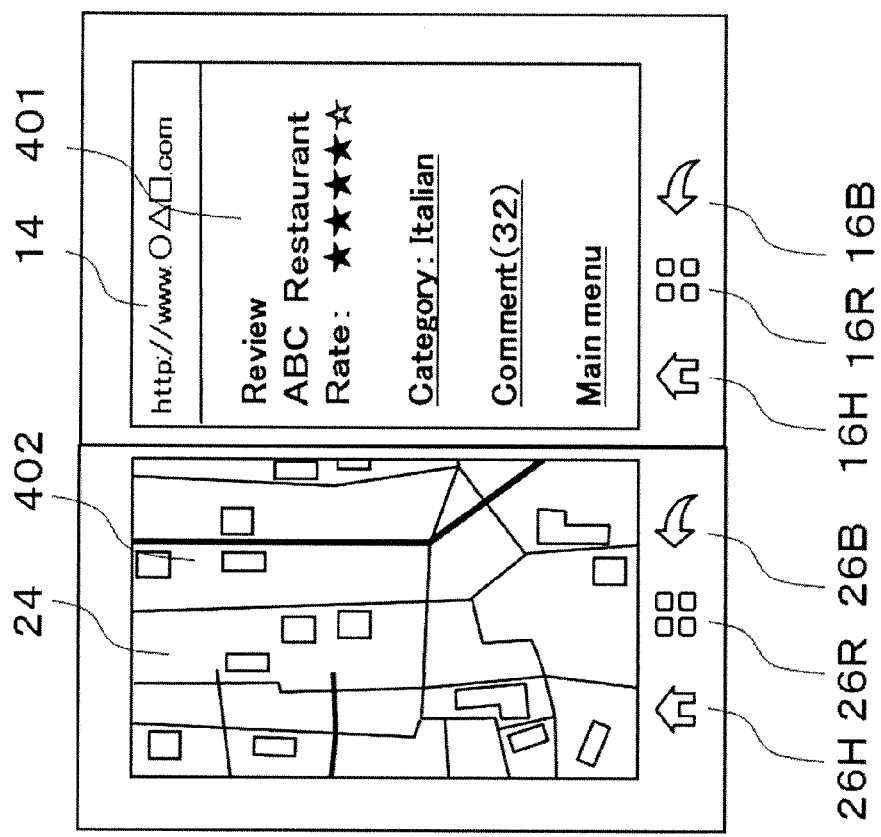

FIGS. 5A and B are illustrations of execution screen of an application in a two-screen state and a one-screen state. In FIGS. 5A and B, a webpage screen 401 based on the execution of the web browser is displayed on the first display surface 14. In FIG. 5A, a map screen 402 based on the execution of the map application is displayed on the second display surface 24.

When the screen state of the mobile phone 1 transitions from the two-screen state to the one-screen state, as shown in FIG. 5B, only the webpage screen 401 is enabled for viewing. At this time, as mentioned above, the CPU100 cancels the display of the map screen 402, which is the second screen.

When the screen is displayed as in FIG. 5A, the first VRAM308 (first screen memory) stores the data of the screen 401 as first screen data, while the second VRAM309 (second screen memory) stores the data of the screen 402 as second screen data.

The CPU100 sets the first task corresponding to the screen 401 and the second task corresponding to the screen 402 to a state in which execution may be conducted by the operation of the user. That is to say, a touch of the first display surface 14 is accepted as the operation for the first task, such that processes based on the first task are conducted. A touch of the second display surface 24 is accepted as the operation for the second task, such that processes based on the second task are conducted.

FIGS. 6A and 6B are illustrations of an exemplary flowchart and a table showing a control process 600 that is conducted when a screen state transitions from a two-screen state to a one-screen state related to according to an embodiment of the disclosure. The various tasks performed in connection with the process 600 may be performed by software, hardware, firmware, a computer-readable medium having computer executable instructions for performing the process method, or any combination thereof. The process 600 may be recorded in a computer-readable medium such as a semiconductor memory, a magnetic disk, an optical disk, and the like, and can be accessed and executed, for example, by a computer CPU such as the CPU 100 in which the computer-readable medium is stored.

It should be appreciated that process 600 may include any number of additional or alternative tasks, the tasks shown in FIG. 6A need not be performed in the illustrated order, and process 600 may be incorporated into a more comprehensive procedure or process having additional functionality not described in detail herein. In practical embodiments, portions of the process 600 may be performed by different elements of the mobile phone 1 such as: the CPU 100, the memory 200, the first display 12, the second display 22, etc. Process 600 may have functions, material, and structures that are similar to the embodiments shown in FIGS. 1-5. Therefore common features, functions, and elements may not be redundantly described here.

This control processing is conducted when the screen state is the two-screen state. FIG. 6B is a table showing the state of the first display surface 14 and the second display surface 24 when the screen state transitions from the two-screen state to the one-screen state and the status of execution (execution, stoppage) of the first task and the second task assigned to the first screen and the second screen. The "Execution" of this table implies that the task is in a state in which execution is possible, while "Stop" implies that the task was discontinued during the process of execution or became impossible to execute once completely executed. Hereinafter, the state corresponding to the "execution" of this table is referred to as a "status of execution," while the state corresponding to "stopped" is referred to as a "stopped state."

In step S101, the CPU100 determines whether or not the screen state of the mobile phone 1 changed from the two-screen state to the one-screen state. When the screen state changes from the two-screen state to the one-screen state (S101: YES), the CPU100 stops the second task (S102) and stops the rendering of the liquid crystal panel of the second display 22 while maintaining the second screen corresponding to the stopped second task at the second VRAM309 (S103) at the same time. Thereby, display of the second screen on the second display surface 24 is cancelled. As a result, as shown in the table in FIG. 6B, the display state at the second display surface 24 is switched from ON (displayed) to OFF (not displayed), while the second task is switched from the status of execution to the stopped state.

When the task is cancelled in the middle of execution and "stopped," the CPU100 stores the execution process of the task to the memory 200 so that the task may be re-started from the point of discontinuation. When this task is once again switched to the "status of execution," the CPU100 obtains the execution process of the task from the memory 200 and advances processing of the task from the point of discontinuation.

Figure 7:
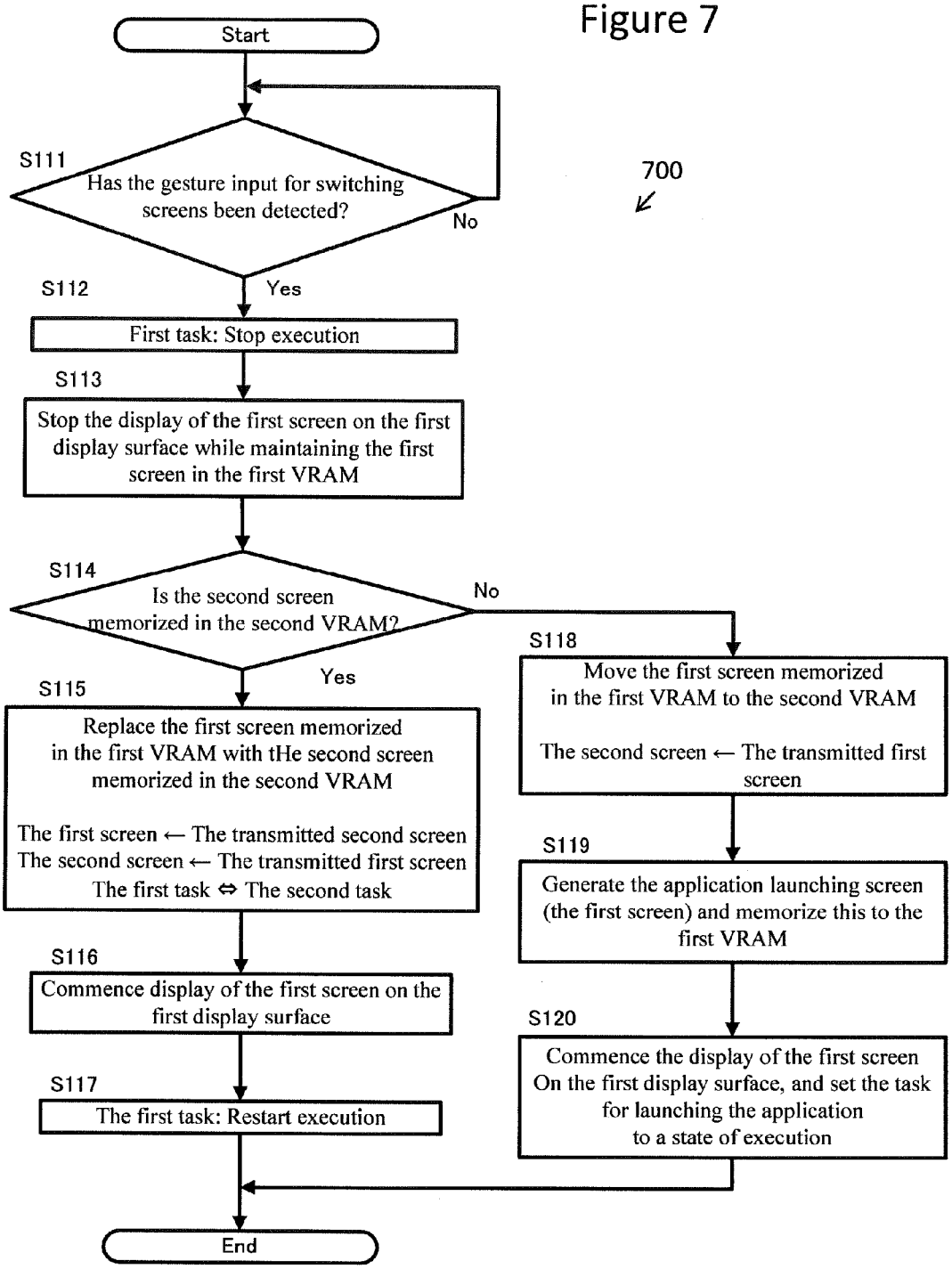
FIG. 7 is an illustration of an exemplary flowchart showing a screen switching process according to an embodiment of the disclosure.

FIG. 7 is an illustration of an exemplary flowchart showing a screen switching process 700 according to an embodiment of the disclosure. The various tasks performed in connection with the process 700 may be performed by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a computer CPU such as the CPU 100 in which the computer-readable medium is stored.

It should be appreciated that process 700 may include any number of additional or alternative tasks, the tasks shown in FIG. 7A need not be performed in the illustrated order, and process 700 may be incorporated into a more comprehensive procedure or process having additional functionality not described in detail herein. In practical embodiments, portions of the process 700 may be performed by different elements of the mobile phone 1 such as: the CPU 100, the memory 200, the first display 12, the second display 22, etc. Process 700 may have functions, material, and structures that are similar to the embodiments shown in FIGS. 1-5. Therefore common features, functions, and elements may not be redundantly described here.

FIG. 7 shows the process 700 when the second screen, in which the display was cancelled due to the screen state transitioning from the two-screen state to the one-screen state, is displayed on the first display surface 14. This process is conducted in the one-screen state. The user may switch the screen displayed on the first display surface 14 from the first screen to the second screen by conducting a designated gesture input on the first display surface 14 in the one-screen state.

In step S111, the CPU100 determines whether or not the designated gesture input was conducted on the first display surface 14.

In the present embodiment, a series of sliding operations of line segments facing up, then down, then up in this order rendered in one stroke is stored in the memory 200 as the designated gesture input for switching screens. The CPU100 divides the trajectory rendered by the sliding operation to a line segment forming a nearly straight line, and detects which four directions of up, down, left, and right the direction of the divided line segment is closest to. Thereby, the CPU100 determines in step S111 whether or not the gesture detected from the sliding operation coincides with the designated gesture.

When the gesture mentioned above is input to the first display surface 14 (S111: YES), the CPU100 conducts processes of steps S112 to S120 as follows, and switches the screen displayed on the first display surface 14 from the first screen to the second screen.

FIGS. 8A and B are screen display examples during the screen switching process. FIG. 8C is a table explaining the state of the first display surface 14 and the second display surface 24, the state of the first display surface 14 and the second display surface 24, the state of the first VRAM308 and the second VRAM309, and the state of the first task and the second task before and after switching screens.

As shown in the trajectory 403 of FIG. 8A, when a gesture input for switching screens is conducted (S111: YES), the CPU100 advances the process to step S112. Though the trajectory 403 is not actually displayed on the first display surface 14, a configuration may be taken in which the trajectory 3 is displayed.

In step S112, the CPU100 stops the first task that was in the status of execution. Then, the CPU100 stops the display of the first screen on the first display surface 14 while maintaining the first screen data at the first VRAM308 (S113).

Next, the CPU100 determines whether or not the second screen data (S114) is stored in the second VRAM309. As in FIGS. 5A and B, if an image is displayed on the second display surface 24 in the two-screen state before switching to the one-screen state, the second screen data is stored in the second VRAM309. In such cases, it is determined as YES in step S114 and the process is advanced to step S115. In cases in which the mobile phone 1 was not used in the two-screen state after the power of the mobile phone 1 was switched ON, the data of the image is not stored in the second VRAM309. In such cases, it is determined as NO in step S114 and the process of step S118 is conducted.

When the second VRAM309 is memorizing the second screen (S114: YES), the CPU100 replaces the first screen data stored in the first VRAM308 with the second screen data stored in the second VRAM309. In such cases, the second screen data to be replaced is, for example, the second screen data displayed on the second display surface 24 immediately before transitioning from the two-screen state to the one-screen state.

The CPU100 transmits the screen data stored in the second VRAM309 as new first screen data to the prescribed address of the first VRAM308. On this occasion, the prescribed address is selected such that the existing first screen data is not overwritten. Subsequently, the CPU100 transmits the first screen data stored in the first VRAM308 to the prescribed address of the second VRAM309 as new second screen data. During such transmission, the RAM of the memory 200 may be used as a temporal storage.

On the occasion of the process of step S115, the CPU100 replaces the first task and the second task. That is to say, in response to the first screen data of the first screen displayed on the first display surface 14 being stored in the second VRAM309 as second screen data, the first task corresponding to this screen is newly stored in the memory 200 as the second task. In response to the second screen data of the second screen displayed on the second display surface 24 being stored in the first VRAM308 as first screen data, the second task corresponding to this screen is newly stored in the memory 200 as the first task.

Next, the CPU100 displays the new first screen on the first display surface 14 and sets the new first task corresponding to the first screen to the status of execution again (S117). The new second task is held in the stopped state.

For example, as mentioned above, when the gesture input (refer to FIG. 8A) is conducted (S114: YES), the data of the webpage screen 401 is stored in the second VRAM309 as second screen data, while the data of the map screen 402 is stored in the first VRAM308 as first screen data. In response to replacement of the screens 401 and 402, the task on the screen 401 is regarded as the second task, while the task on the screen 402 is regarded as the first task (S115). Subsequently, as shown in FIG. 8B, the map screen 402, which is the new first screen, is displayed on the first display surface 14 (S116) and the task corresponding to the map screen 402 is set to the status of execution again as the first task. At this time, the second task corresponding to the webpage screen 401 is, as shown in FIG. 8C, in the stopped state.

In the display state of FIG. 8B, when the user conducts the operation of switching screens (gesture input) again, the webpage screen 401 is displayed on the first display surface 14 again based on the flow chart of FIG. 7.

If determined as NO in step S114, the screen and task that should be displayed are not present; therefore, the application start-up screen (refer to FIG. 9B) is displayed on the first display surface 14.

In step S118, the CPU100 transmits the first screen data stored in the first VRAM308 to the second VRAM309. Then, the CPU100 generates the data of the application start-up screen and stores the generated data to the first VRAM308 as new first screen data (S119). Subsequently, the CPU100 commences display on the first display surface 14 of the application start-up screen, which is the new first screen, along with setting to the status of execution the task corresponding to the application start-up screen as the first task (S120).

Figure 10:
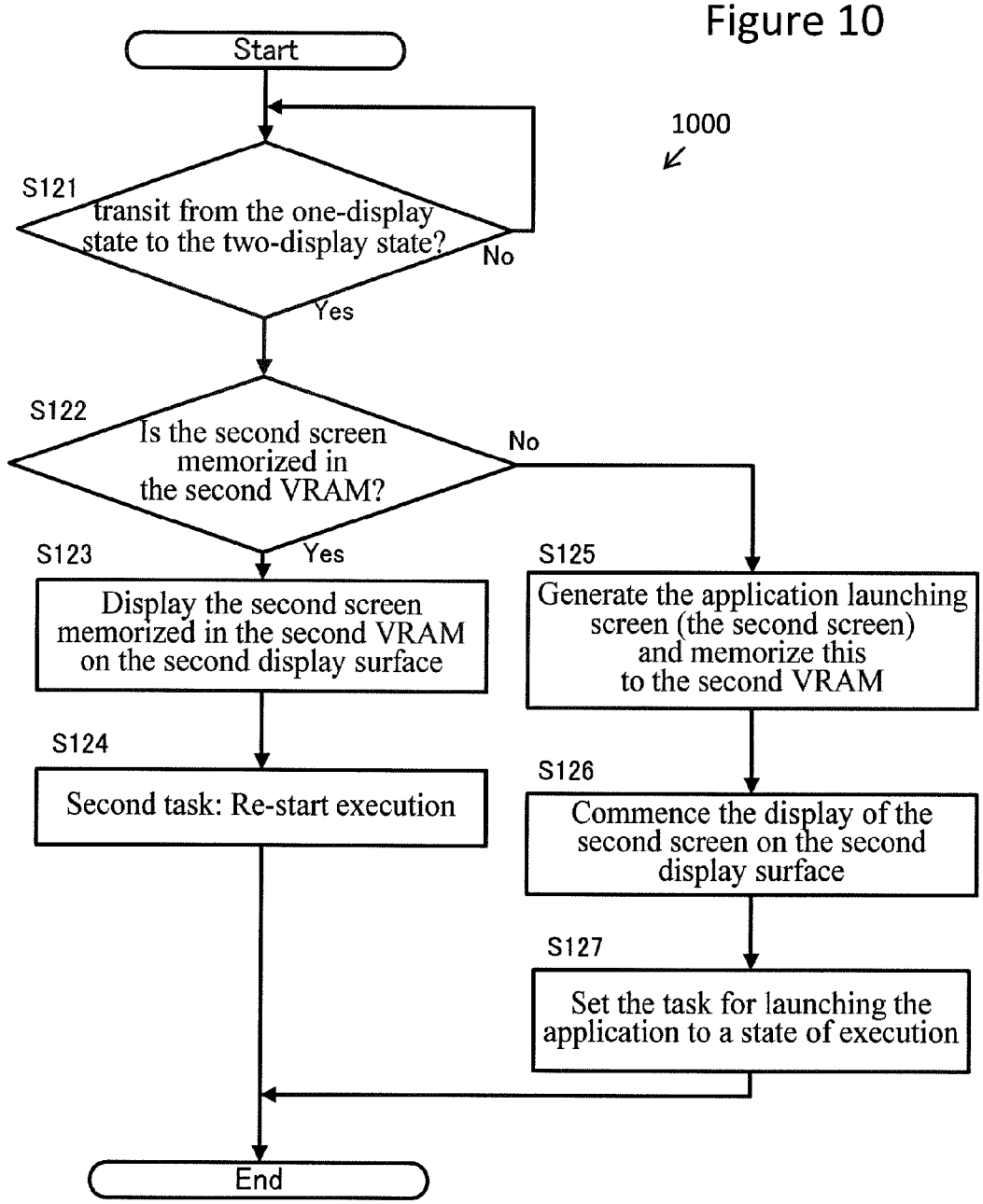
FIG. 10 is an illustration of an exemplary flowchart showing a control process conducted when a screen state related transitions from a one-screen state to a two-screen state according to an embodiment of the disclosure.

FIGS. 9A to 9C are illustrations of an exemplary display of a screen showing a screen switching process and a table showing a change in status of execution of a task according to an embodiment of the disclosure FIG. 10 is an illustration of an exemplary flowchart showing a control process conducted when a screen state transitions from a one-screen state to a two-screen state according to an embodiment of the disclosure. FIGS. 9A and B are screen display examples at the time of the screen switching process when the second VRAM309 is not storing the second screen. FIG. 9C is a table showing the state of the first and the second display surface 24 before and after the screen switching process, the state of the first VRAM308 and the second VRAM309, and the state of the first task and the second task.

As shown in FIG. 9A, when the gesture input to the switching screen is conducted (S111: YES) and the second VRAM309 is not memorizing the second screen (S114: NO), the CPU100 transmits the data of the webpage screen 401 to the second VRAM309 and stores this as second screen data (S118). The CPU100 stores the generated data of the application start-up screen to the first VRAM308 as first screen data (S119). Subsequently, the CPU100 commences displaying on the first display surface 14 of the first screen (S120). Thereby, as in FIG. 9B, the application start-up screen is displayed on the first display surface 14. Then, the CPU100 sets the task in order to launch each application assigned to the application start-up screen to the status of execution as the first task (S120). Thereby, when the icon of the application is operated, the application corresponding to the icon launches.

FIG. 10 is an illustration of flowchart showing a control process conducted when a screen state transitions from a one-screen state to a two-screen state according to an embodiment of the disclosure. The various tasks performed in connection with the process 1000 may be performed by software, hardware, firmware, a computer-readable medium having computer executable instructions for performing the process method, or any combination thereof. The process 1000 may be recorded in a computer-readable medium such as a semiconductor memory, a magnetic disk, an optical disk, and the like, and can be accessed and executed, for example, by a computer CPU such as the CPU 100 in which the computer-readable medium is stored.

It should be appreciated that process 1000 may include any number of additional or alternative tasks, the tasks shown in FIG. 10 need not be performed in the illustrated order, and process 1000 may be incorporated into a more comprehensive procedure or process having additional functionality not described in detail herein. In practical embodiments, portions of the process 1000 may be performed by different elements of the mobile phone 1 such as: the CPU 100, the memory 200, the first display 12, the second display 22, etc. Process 1000 may have functions, material, and structures that are similar to the embodiments shown in FIGS. 1-5. Therefore common features, functions, and elements may not be redundantly described here.

In step S121, the CPU100 determines whether or not the screen state transitioned from the one-screen state to the two-screen state. If it did transition to the two-screen state (S121: YES), the CPU100 determines whether or not the second VRAM309 is memorizing the second screen (S122).

If the second VRAM309 is storing the second screen data (S122), the CPU100 commences displaying on the second display surface 24 of the second screen stored in the second VRAM309 (S123) and sets the second task corresponding to the displayed second screen to the status of execution again (S124).

FIGS. 11A to 11D are illustrations of an exemplary display when a screen state transitions from a one-screen state to a two-screen state and a diagram showing a change in status of execution of a task according to an embodiment of the disclosure. This display example is when the state of FIG. 8B results from the state of FIG. 8A due to the process of FIG. 7 and subsequently, the screen state transitions from the one-screen state to the two-screen state. The diagram of FIG. 11A shows the mobile phone 1 in the same state as FIG. 8B. FIG. 11B is a display example of the screen after the screen state transitions to the two-screen state in the display status of FIG. 11A.

In the status of FIG. 11A, when the screen state transitions from the one-screen state to the two-screen state, the CPU100 displays the webpage screen 401, which is the second screen stored in the second VRAM309, to the second display surface 24 as in FIG. 11B (S123), and sets the second task corresponding to the webpage screen 401 corresponding to this second screen to the status of execution again (S124).

FIG. 11C is a table explaining the state of the first and the second display surface 24 and the state of the first and the second task when the screen state transitions from the one-screen state to the two-screen state. As shown in this table, the display status of the second display surface 24 is switched from OFF to ON, while the second task is set to the status of execution.

FIG. 11D is a diagram showing the display example of the screen of the first and the second display surface 24 when the second VRAM309 was not memorizing the second screen.

When the second VRAM309 is not memorizing the second screen (S122: NO), the CPU100 displays the application start-up screen 404 on the second display surface 24 as in FIG. 11D (S126) and sets the task in order to launch each application assigned to the application start-up screen to the status of execution as the first task (S127).

FIGS. 12A to 12D are illustrations of an exemplary flowchart showing a control process 1200 in for switching screens and exemplary diagrams showing a screen upon execution of the process according to an embodiment of the disclosure.

Figure 12C:
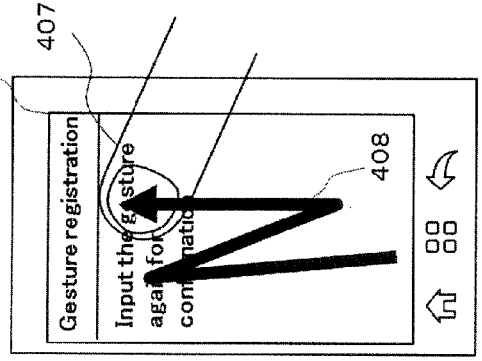
FIGS. 12A to 12D are illustrations of an exemplary flowchart showing a control process for switching screens and exemplary diagrams showing a screen upon execution of the process according to an embodiment of the disclosure.
Figure 12B:
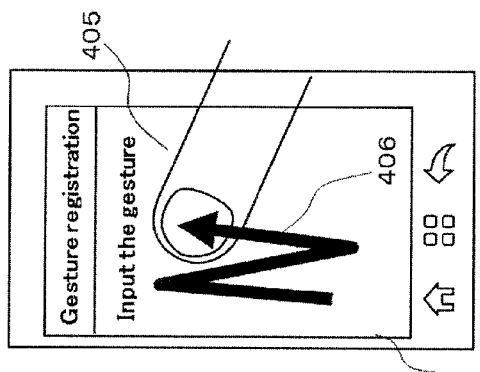
Figure 12D:
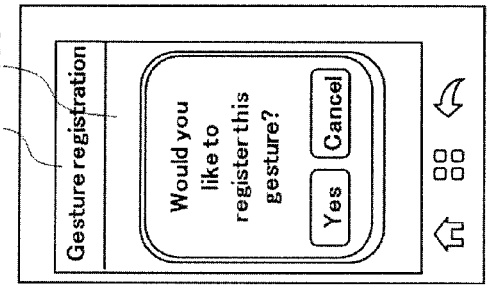
Figure 12A:
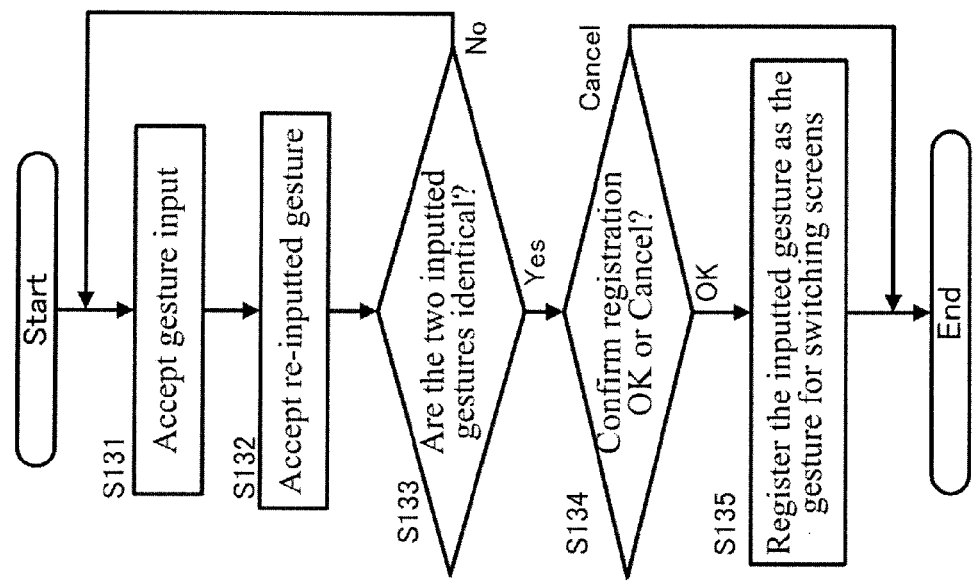

FIG. 12A shows a flowchart showing a gesture registration process 1200 for switching screens. FIGS. 12B to D are diagrams showing the display examples of the execution screens 405, 407, and 409 of the gesture registration process. The various tasks performed in connection with the process 1200 may be performed by software, hardware, firmware, a computer-readable medium having computer executable instructions for performing the process method, or any combination thereof. The process 1200 may be recorded in a computer-readable medium such as a semiconductor memory, a magnetic disk, an optical disk, and the like, and can be accessed and executed, for example, by a computer CPU such as the CPU 100 in which the computer-readable medium is stored.

It should be appreciated that process 1200 may include any number of additional or alternative tasks, the tasks shown in FIG. 12A need not be performed in the illustrated order, and process 1200 may be incorporated into a more comprehensive procedure or process having additional functionality not described in detail herein. In practical embodiments, portions of the process 1200 may be performed by different elements of the mobile phone 1 such as: the CPU 100, the memory 200, the first display 12, the second display 22, etc. Process 1200 may have functions, material, and structures that are similar to the embodiments shown in FIGS. 1-5. Therefore common features, functions, and elements may not be redundantly described here.

When the gesture registration process for switching screens is commenced, the CPU 100 as a screen-switch setter accepts a gesture input (refer to trajectories 406, 407) for switching screens by the user two times in step S131, as in FIGS. 12B and C (S131, S132). The CPU100 detects the gesture from these two sliding operations and determines whether or not the two detected gestures are identical (S133). When these two gestures are not identical (S133: NO), it returns to step S131.

In the case of FIGS. 12B and C, the CPU100 detects identical gestures of "up, down, up" from these two trajectories as elements of the direction of operation. In such cases, this is determined as YES in step S133 and proceeds to step S134. In step S134, confirmation is provided to the user regarding whether or not the input gesture should be registered as the operation for switching screens, as in screen 409 of FIG. 12D (S134). When the registration of the gesture input by the user is selected (S134: OK), the CPU100 registers the input gestures (elements of direction of "up, bottom, up") as the gestures for switching screens (stored in the memory 200).

From the above, according to the present embodiment, when an operation for switching screens is conducted in the one-screen state, the display on the first screen displayed on the first display surface 14 is cancelled. Subsequently, when the screen state transitions from the two-screen state to the one-screen state, the second screen displayed on the second display surface is displayed on the first display surface 14 as the new first screen. At this time, the first task corresponding to the first screen displayed before switching screens is stopped. Then, the second task corresponding to the second screen displayed on the second display surface when the screen state is transitioning from the two-screen state to the one-screen state is regarded as the status of execution as the new first task. Thereby, regarding the first task, accepting inputs to the first display surface 14 is enabled.

The user need only conduct the prescribed input operation (gesture input) to the first display surface for switching screens. When this operation is conducted, as mentioned above, the first screen and the second screen are replaced. Thereby, the user is able to easily display the screen that was displayed on the second display surface 24 on the first display surface 14. The user may conduct the operation for switching screens several times, so the first screen and the second screen may be replaced with each other numerous times, making it convenient.

The first screen data is stored in the first VRAM308, while the second screen data is stored in the second VRAM309. When the operation for switching screens is conducted, the first and second screen data is replaced between the first VRAM308 and the second VRAM309. That is to say, the first screen data mentioned above is stored in the second VRAM309 as new second screen data, while the second screen data mentioned above is stored in the first VRAM308 as first screen data. Therefore, when the new second screen is displayed on the first display surface by the operation of switching screens, the process for newly generating the screen displayed on the first display surface does not have to be conducted, rendering it unnecessary for the CPU100 to spend time on this process. Thereby, when the operation of switching screens is conducted, the new first screen may be displayed on the first display surface 14 immediately.

Even when an open operation of transitioning the screen state to the one-screen state to the two-screen state, the process for generating the screen displayed on the second display surface does not have to be conducted. That is to say, the CPU100 need only display the second screen data already stored in the second VRAM309 on the second display part. Thereby, when the open operation is conducted, the second screen may be immediately displayed on the second display surface 24.

When the operation for switching screens is conducted when the second screen data is not stored in the second VRAM309, the CPU100 displays the application start-up screen on the first display surface. Therefore, the user may launch the desired application by selecting any icon image comprised in the application start-up screen following the operation of switching screens, making it convenient.

Embodiment 2

In Embodiment 1 mentioned above, the data of the currently displayed first screen (hereinafter, referred to as "the current first screen") (hereinafter, referred to as "the current first screen data") and the data of the second screen displayed on the second display surface 24 last (hereinafter, referred to as "the current second screen") in the two-screen state (hereinafter, referred to as "the current second screen data") were switched between the first VRAM308 and the second VRAM309 when switching screens. In contrast, in the present embodiment, in addition to this current first screen data and current second screen data, the data of the first screen (hereinafter, referred to as "the past first screen") and the second screen (hereinafter, referred to as "the past second screen") displayed in the past (hereinafter, referred to as "the first screen data of the past," "the second screen data of the past") stored in the first VRAM308 and the second VRAM309 are switched between the first VRAM308 and the second VRAM309 when switching screens. The CPU as a return-operation detector detects operations to return from the currently displayed screen to a screen displayed in the past.

Hereinafter, the data group stored in the first VRAM308, that is to say, the data group comprising the current first screen data and all the first screen data of the past, is referred to as "the first screen data group," while the data group stored in the second VRAM309, that is to say, the data group comprising the current second screen data and all the second screen data of the past, is referred to as "the second screen data group."

By such processes being conducted, not only may the switching process of the current first screen and the second screen be rapidly conducted as in Embodiment 1 mentioned above but an effect of the relevant screen being rapidly displayed may be exhibited even when operations of returning to the last previous screen after switching screens (such as pushing a Back key 16B, 26B, and the like) are conducted.

FIGS. 13A to 13E are illustrations of an exemplary display and an exemplary table of a screen showing a first task list related according to an embodiment of the disclosure.

FIGS. 13A to E are diagrams explaining the first task list. The first task list is a list comprising the screen displayed on the first display surface 14 and the execution process of the task conducted when displaying of the screen was terminated as history, which is generated and updated by the CPU100 and stored in the memory 200. FIGS. 13A to D are diagrams explaining the screen displayed on the first display surface 14 in order. FIG. 13E is a diagram showing the first task list corresponding to the history of the order of this screen.

When a home screen (not illustrated) is displayed on the first display surface 14, pushing the Launcher key 16R displays the application start-up screen 404, as in FIG. 13A. Here, for example, when the search application is launched due to any of the icons A1 to A9 comprising the application start-up screen 404 being pushed (touch), the search screen 410 is displayed as in FIG. 13B. When the user conducts operations for commencing a search by inputting a search keyword in the first display surface 14, as in FIG. 13C, a webpage screen 411 comprising search results (hereinafter, referred to as "a webpage 1") is displayed on the first display surface 14. Here, when any link text displayed on the screen 411 of the webpage 1 is selected, as shown in FIG. 13D, a screen 412 of the following webpage (hereinafter, referred to as "a webpage 2") is displayed on the first display surface 14. A part or all of these screens 404 to 412 are stored in the first VRAM308.

As a result, the first task list as shown in FIG. 13E is generated and stored in the memory 200. This first task list associates a display order (number) of the screen with information showing the final execution process (execution process of the task) in the task executed on the screen of each order (the current first task and the past first task). In FIG. 13E, the larger the number, the newer the display order of the screen. That is to say, the current first screen (screen 412 of the webpage 2), which is the newest screen, corresponds with the third number, while the first screen (search screen 410), which is the oldest, corresponds with the first number.

FIGS. 14A to 14F are illustrations of display examples and a table of a screen showing a second task list according to an embodiment of the disclosure.

FIGS. 14A to F are diagrams explaining the second task list. The second task list is a list comprising a screen displayed on the second display surface 24 and the execution process of the task conducted when displaying of the screen was terminated as history. The second task list is stored in the memory 200 in the same manner as the first task list.

FIGS. 14B to E are diagrams showing the screen displayed on the second display surface 24 after the application start-up screen 404 of FIG. 14A has been displayed in the two-screen state in order. In these diagrams, the illustration of the first display surface 14 is abbreviated.

FIGS. 14B to E show a screen 413 listing incoming E-mails when using the E-mail application (one), a screen 414 showing the content of the incoming E-mail (two), a screen of a webpage 3 when using the web browser application (three), and the map screen 416 of the map application (four) displayed in order from the state of FIG. 14A. FIG. 14F is the second task list showing the history of screens displayed on the second display surface 24.

Figure 15:
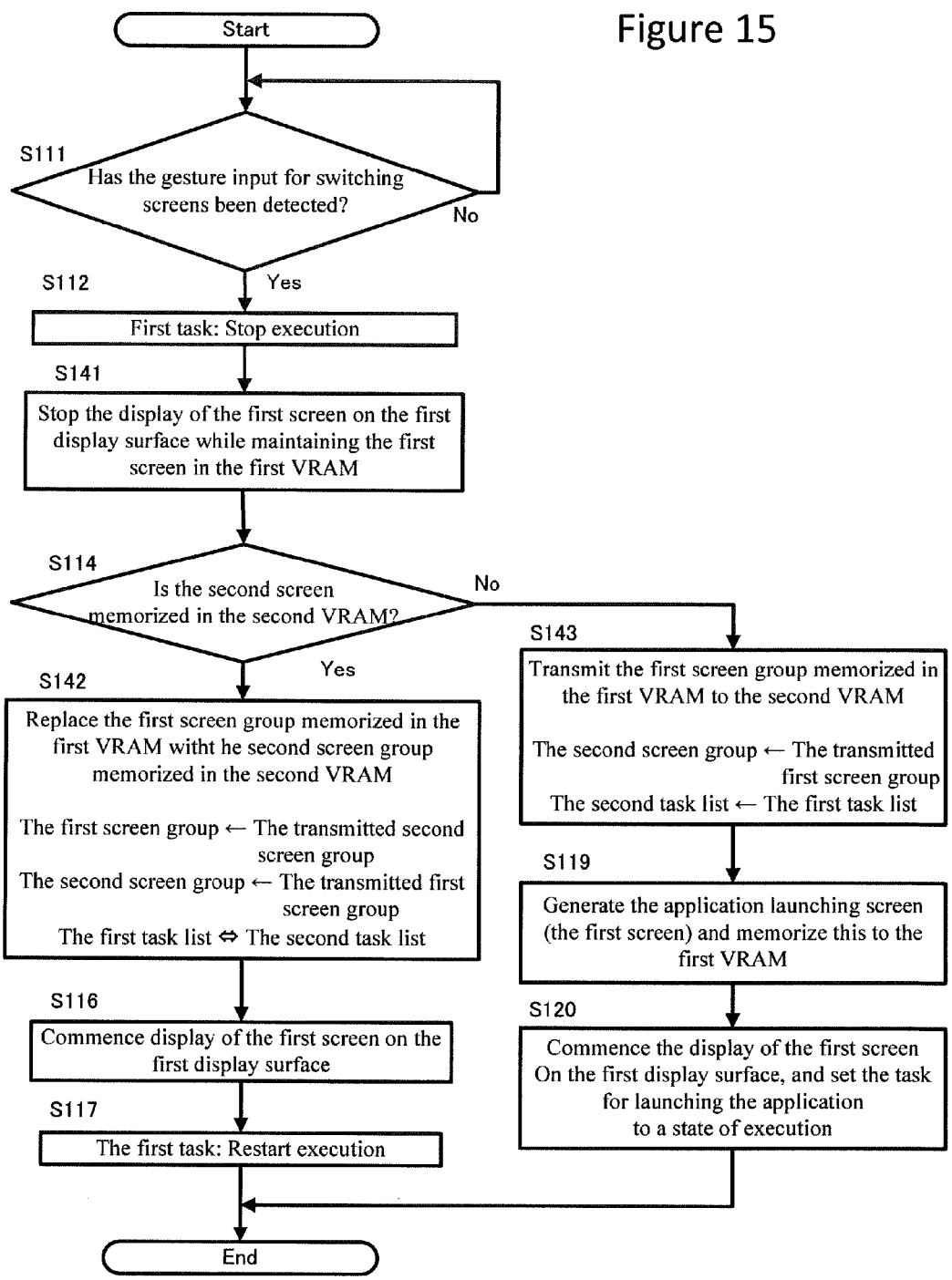
FIG. 15 is an illustration of an exemplary flowchart showing a screen switching process according to an embodiment of the disclosure.

FIG. 15 is an illustration of an exemplary flowchart showing a screen switching process according to an embodiment of the disclosure.

In the flowchart of FIG. 15, the process of step S113 is replaced by the process of step S141, the process of step S115 is replaced by the process of step S142, and the process of step S118 is replaced by the process of step S143 in contrast with the flow chart of FIG. 7.

In step S141, the CPU100 stops the display on the first display surface of the first screen while maintaining the first screen data of the first screen group (hereinafter, referred to as "the first group data") comprising the current first screen and the past first screen in the first VRAM. That is to say, not only the current first screen data, but also the first screen data of the past is maintained in the first VRAM308.

In step S142, the CPU100 switches the first screen group and the second screen data (hereinafter, referred to as the second screen group data) of the second screen group comprising the present second screen and the past second screen between the first VRAM308 and the second VRAM309. At this time, the second screen group data transmitted to the first VRAM308 is regarded as the first screen group data, while the first screen group data transmitted to the second VRAM309 is regarded as the second screen group data. In the same manner, the first task list corresponding to the first screen group and the second task list corresponding to the second screen group are replaced.

In step S143, the first screen group data is transferred to the second VRAM309. That is to say, not only the current first screen data, but also the past second screen data is transferred to the second VRAM309. The first task list is also registered as the second task list.

In this manner, when operations for switching screens (gesture) are conducted, not only are the current first screen and second screen switched, but the past first screen and the second screen are also replaced between the first and the second VRAM.

Figure 16A:
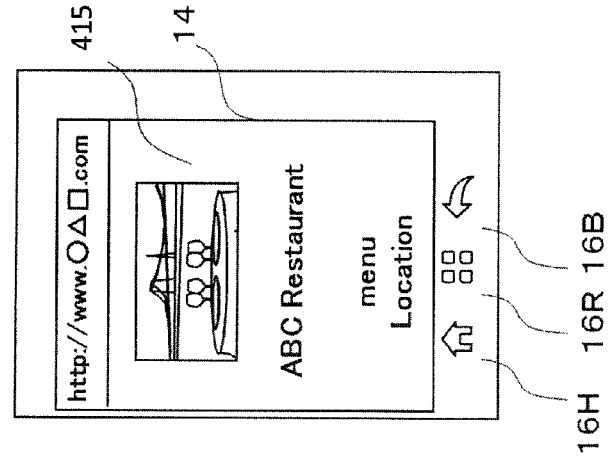

For example, when the first task list and the second task list explained in FIGS. 13 and 14 are stored in the memory 200, the first screen group and the second screen group are replaced as a result of conducting the screen switching process of FIG. 15, while the first task list and the second task list are also replaced. In this case, the display on the first display surface 14 of the screen 412 (the first screen) of FIG. 13D is cancelled and the screen 416 of FIG. 14E is displayed on the first display surface 14 as the new first screen. At this time, as shown in FIGS. 16A and B, the displayed screen transitions.

Figure 16B:
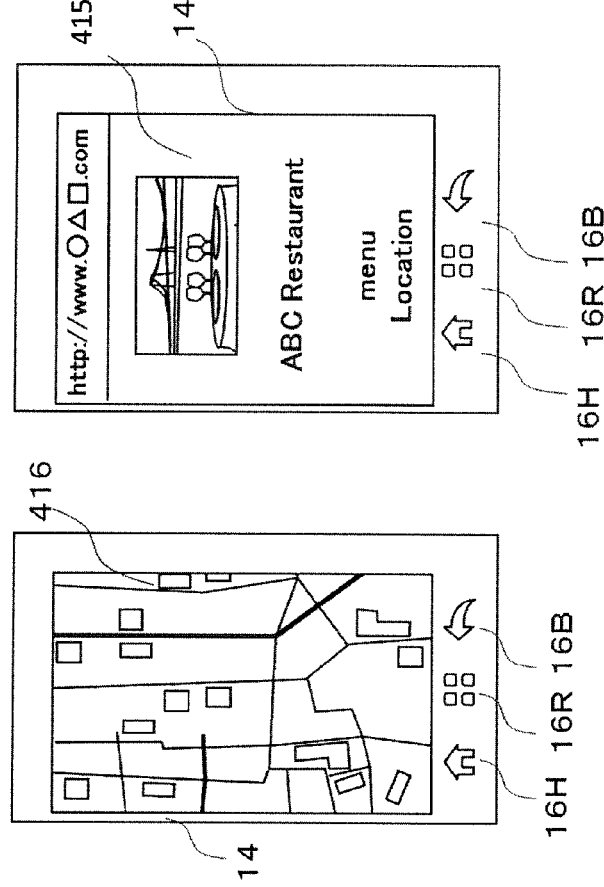

In the state of FIG. 16B, when a Back key 16B arranged on the first cabinet 10 is pressed, the CPU100 cancels the display on the current first screen (FIG. 16B) while stopping the map application corresponding to this first screen. Subsequently, the CPU100 deletes the last column (four) registered on the current first task list (FIG. 14F) (refer to FIG. 16D) while conducting the third task on the first display surface 14. That is to say, the CPU100 displays the screen 415 of the webpage 3 on the first display surface 14 as the current first screen as in FIG. 16C and commences execution of the tasks corresponding to this first screen. At this time, the task is conducted from the execution process of the task registered third in the first task list of FIG. 16D.

The CPU100 does not newly generate the screen 415 when displaying the screen 415 of the webpage 3 on the first display surface 14 and only needs to output the data of the screen 415 corresponding to the third task list stored in the first VRAM308 on the first display 12. Thereby, the CPU100 may omit the process for generating screens and display the screen 415 on the first display surface 14 in a time shorter than the time required for generating screens once the Back key 16B is pushed.

Figure 16C:
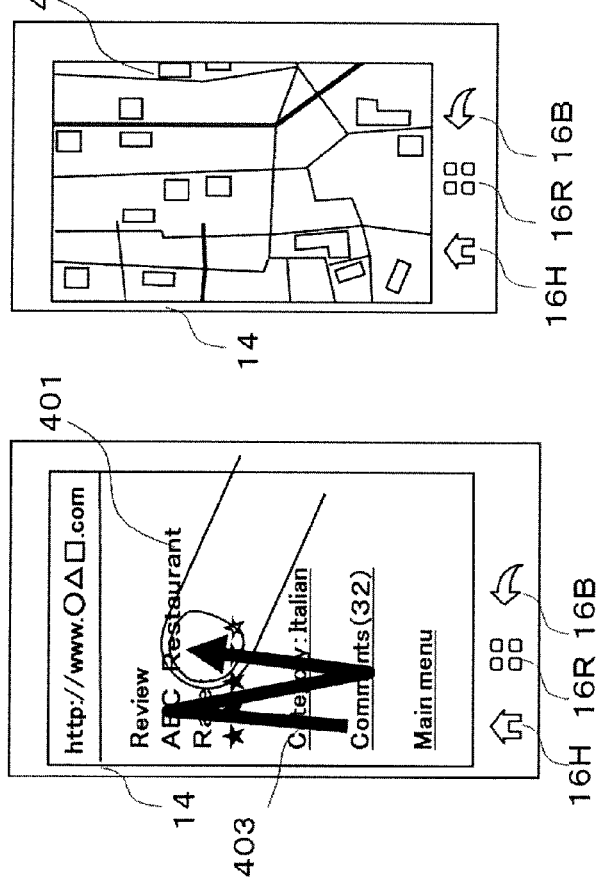

When the second screen is not stored in the second VRAM309, the existing second screen as in FIG. 16C is not displayed; however, the application start-up screen 404 is displayed on the first display surface 14 in the same manner as Embodiment 1 (S120).

As mentioned above, according to the configuration of the present embodiment, the first task list and the second task list are replaced by each other when the screen switching operation is conducted. The first screen group data and the second screen group data are also replaced between the first VRAM308 and the second VRAM309.

Thereby, when the operation of displaying the last previous screen (pushing the Back key 16B) is conducted, the CPU100 does not conduct the process of generating the past first screen if the first past screen, which is the last previous screen, is stored in the first VRAM309, but uses the past first screen stored in the first VRAM308 instead in order to display this on the first display surface 14. Consequently, not only when the operation of switching screens is conducted as in Embodiment 1, but the first screen, which is the display subject, is immediately displayed on the first display surface 14 even when displaying the last previous screen, and operations to this screen may also be accepted smoothly.

In the above, embodiments related to the present invention were explained; however, the present invention is not in any manner limited to the embodiments mentioned above. Various alterations other than those mentioned above are possible regarding the embodiments of the present invention.

Modified Embodiment 1

In Embodiments 1 and 2 mentioned above, the first screen and the second screen were replaced by the prescribed gesture input (S111); however, the operation for switching screens is not limited to gesture inputs and may be an operation conducted by the user at a desired timing. In Modified Embodiment 1, screen switching is conducted based on whether or not the function key 26F1 arranged in the second cabinet 20 is pushed or not, rather than gesture input.

Figure 17B:
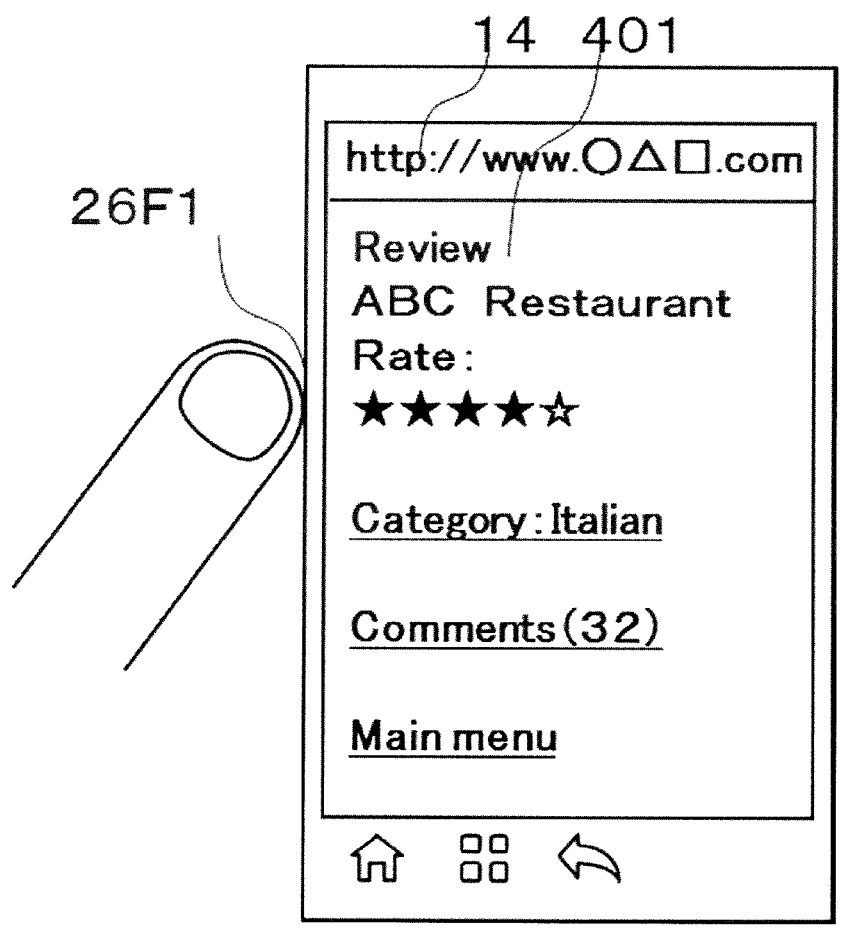

In such cases, the flow chart of FIG. 7 is modified as in FIG. 17A. In the flow chart of FIG. 17A, step S111 of FIG. 7 is replaced by step S151. In step S151, the CPU100 determines whether or not the function key 26F1 of FIG. 17B was pushed as an operation for switching screens and if the function key 26F1 was pushed (S151: YES), the processes from step S112 onwards are conducted.

Modified Embodiment2

In Modified Embodiment 2, screen switching is conducted based on whether or not the icon displayed on the first display surface 14 was touched.

Figure 18B:
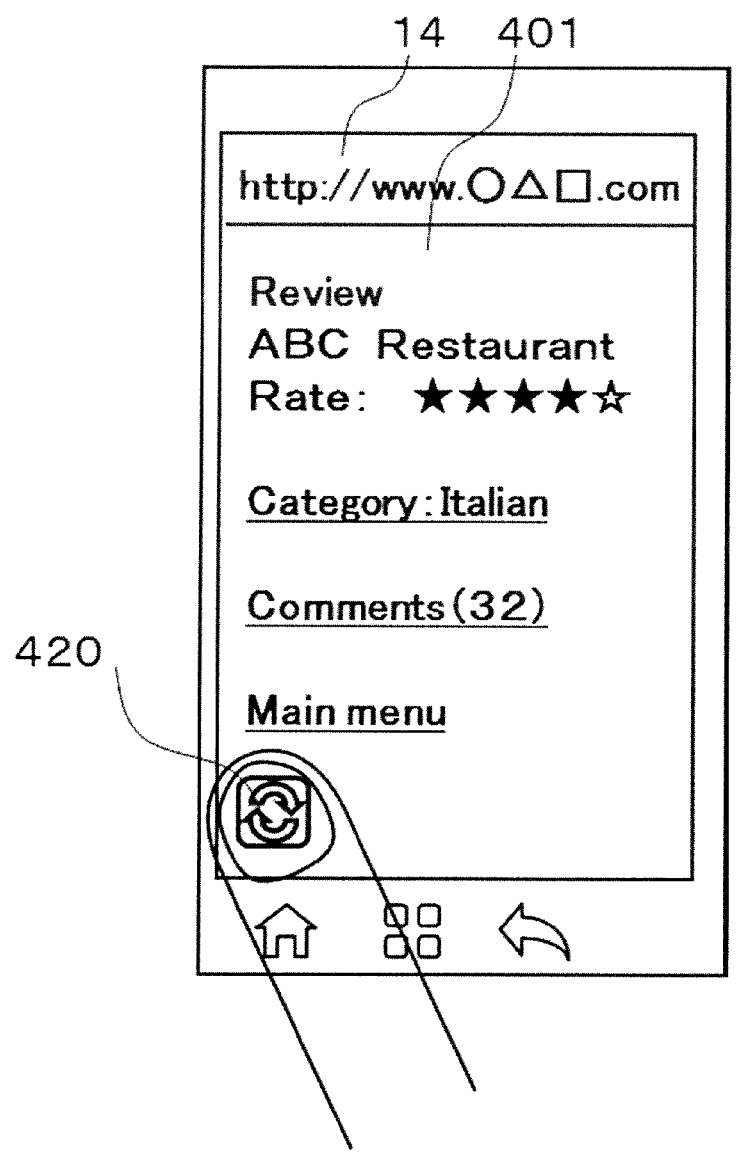

FIGS. 18A and 18B are illustrations of an exemplary flowchart showing a screen switching process and an exemplary diagram showing a situation in which an operation for switching screens is conducted according to an embodiment of the disclosure.

In this case, as in FIG. 18B, a semi-transparent icon 420 for switching screens is displayed on the first display surface 14. The icon 420 may be displayed anywhere on the first display surface 14 but preferably at a location that does not interfere with viewing, such as near the rim of the first display surface 14 or the like. The displayed icon 420 is displayed in a semi-transparent state so that there is no interference with viewing of the first screen; however, in order to enhance the visibility and the like, for example, it may be displayed in a semi-transparent state.

The flow chart of FIG. 7 is modified as in FIG. 18A. In the flow chart of FIG. 18A, step S111 of FIG. 7 is replaced by the process of step S152. In step S152, the CPU100 determines whether or not the icon 420 was touched and if the icon 420 is pushed (S152: YES), it conducts the processes from step S112 onwards.

Modified Embodiment 3

In Modified Embodiment 3, screen switching is conducted based on the acceleration detected by the acceleration sensor 312 rather than operations to the first display surface 14 and keys.

Figure 19B:
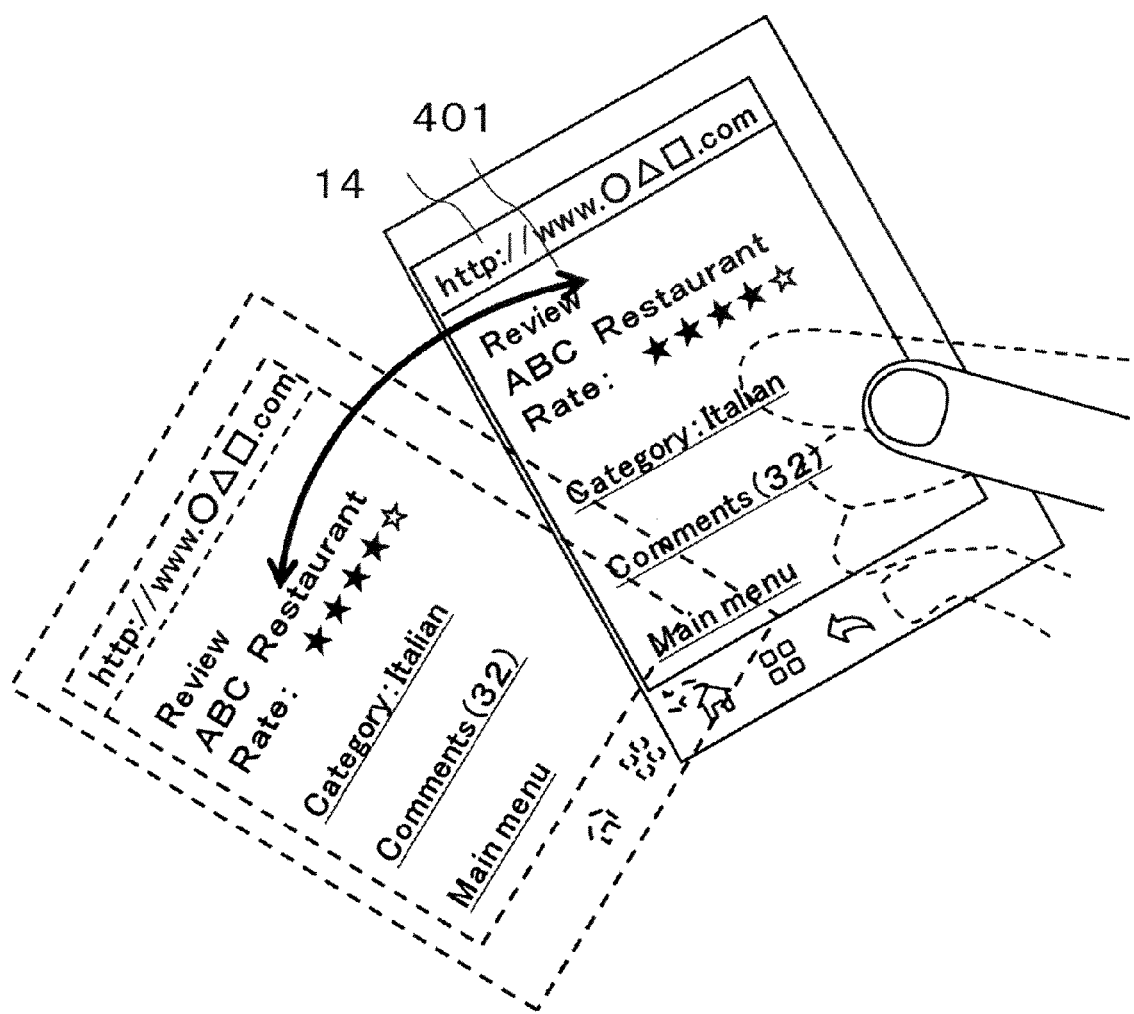

FIGS. 19A and 19B are illustration of an exemplary flowchart showing a screen switching process and an exemplary diagram showing a situation in which an operation for switching screens is conducted according to an embodiment of the disclosure.

In this case, the flow chart of FIG. 7 is modified as in FIG. 19A. In the flow chart of FIG. 19A, step S111 of FIG. 7 is replaced by step S153.

The CPU100 detects an operation of quickly shaking the mobile phone 1 once as shown in FIG. 19B based on the acceleration detected by the acceleration sensor 312 (hereinafter, referred to as "shake"). The CPU100 detects the acceleration with the acceleration sensor 312 having a predetermined threshold or larger within a predetermined time (for example, several hundred milliseconds) and subsequently detects whether or not the acceleration returned to normal size (the size close to gravitational acceleration in a state of rest). The CPU100 determines that a shaking operation was conducted when such acceleration is detected.

In step S153, the CPU100 determines whether or not the shaking operation was conducted as the operation for switching screens, and when the shaking operation was conducted (S153: YES), it conducts the processes from step S112 onwards.

<Others>

The configurations of Modified Embodiments 1 to 3 mentioned above are applicable to Embodiment 2 as well, and not only Embodiment 1. That is to say, the first and second task lists may be replaced by each other at the same time the screen displayed on the first display surface 14 is switched based on pushing the hard keys, selecting icons, shaking operations, and the like.

In Modified Embodiments 1 to 3 mentioned above, hard keys, icons, shaking operations, and the like were used for switching screens; however, a variety of keys, buttons and the like such as the soft keys displayed on the first display surface 14 and the like may be used instead of the hard key, while images other than the icon images may also be displayed. The switching process of the screen may be conducted based on the fact that the prescribed operation was detected using other sensors and not the shaking operation. Various means may be used regarding these operations for switching screens as long as they may be easily conducted by the user.

In Embodiments 1 and 2 as well as Modified Embodiments 1 to 3 mentioned above, the embodiment of the present invention was explained and illustrated with the mobile phone 1 in the one-screen state and vertical orientation; however, the present invention may be applied when the mobile phone 1 is used in any orientation. For example, in the screen switching process of FIGS. 8A and B, it may be conducted even when the mobile phone 1 is in a horizontal orientation, as in FIGS. 20A and B.

In Embodiments 1 and 2 mentioned above, the gesture input comprising sliding in the four directions of up, bottom, left, and right was illustrated as the operation for switching screens; however, the sliding direction is not limited to these four directions and may be the gesture input comprising, for example, sliding in eight directions. Gestures for switching screens may be set by sliding operations describing prescribed curves such as arcs and the like and/or sliding operations passing predetermined areas and the like. In this manner, operations by gesture inputs for switching screens may be operations of various touches.

In Embodiments 1 and 2 as well as Modified Embodiments 1 to 3 mentioned above, gesture inputs, pushing the hard key, pushing the touch keys, tapping the icons, shaking, and the like were illustrated as operations for switching screens. These operations for switching screens are only examples and processes for switching screens may be conducted based on other forms of operations. For example, the process for switching screens may be conducted based on a voice input in which a predetermined speech is input into the microphone 302 comprised in the mobile phone 1. In such manner, the process for switching screens may be conducted based on various operations of the user.

In Embodiment 2 mentioned above, the first screen group data stored in the first VRAM 308 and the second screen group data stored in the second VRAM 309 were simultaneously replaced; however, the timing in which the first screen group data and the second screen group data are replaced between the VRAMs may differ according to the screens. For example, a configuration may be taken in which only the present second screen data among the second screen group data is transmitted to the first VRAM 308 when conducting processes for switching screens. In such cases, for example, the past second screen data may be transmitted to the first VRAM 308 and stored as the current first screen when it needs to be displayed on the first display surface 14, such as the Back key 16B being pushed, and the like. Even when such processes are conducted, the transmission of data between the first and the second VRAM 308 and 309 tends to be completed faster when compared to the time required for re-generating the screen again. Regarding the transmission of the first screen data of the past and the second screen data of the past, a configuration may be taken in which a background process is conducted.

In Embodiments 1, 2, and Modified Embodiments 1 to 3 mentioned above, the application start-up screen was displayed on the first display surface 14 when the second screen was not stored in the second VRAM 309 during the screen switching process; however, other screens such as the home screen and the like may be displayed instead of the application start-up screen. During the screen switching process, the screen displayed when the second screen is not stored in the second VRAM 309 may be selected and set by the user in advance. The application start-up screen displayed in such a manner, the home screen, and the screen set by the user may be stored in the first VRAM 308 or the second VRAM 309 and/or the memory 200 in advance and a configuration may be taken in which these are read when necessary.

Figure 20B:
FIGS. 20A and 20B are illustrations of exemplary diagrams showing a screen switching process in a one-screen state according to an embodiment of the disclosure.
Figure 20A:
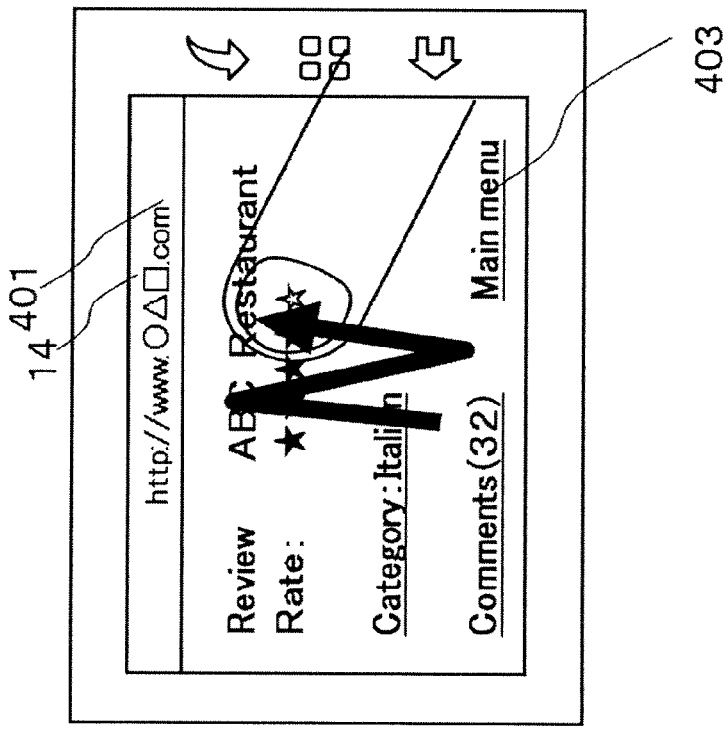

FIGS. 20A and 20B are illustrations of exemplary diagrams showing a screen switching process in a one-screen state according to an embodiment of the disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the CPU 100 to cause the CPU 100 to perform specified operations. Such instructions, generally referred to as "computer program code" or "program code" (which may be grouped in the form of computer programs or other groupings), when executed, enable a method of using a system such as the mobile phone 1.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device comprising:
a first cabinet comprising a first display operable to display a first screen and receive a touch input by a user;
a second cabinet comprising a second display operable to display a second screen;
a supporting section operable to support the first cabinet and the second cabinet in a manner allowing for switching between
a one-display mode in which only the first display is viewable at a time, and
a two-display mode in which both the first display and the second display are viewable at a time; and
a control module operable to, when the first display receives a touch input comprising a predefined touch movement on the first display in the one-display mode, cancel displaying of the first screen on the first display and display the second screen on the first display.

2. The mobile electronic device according to claim 1, wherein the control module is further operable to, when the mobile electronic device is switched from the two-display mode to the one-display mode while a second screen is being displayed on the second display and subsequently the touch input comprising the predefined touch movement is detected on the first display in the one-display mode, cause the first display to display the second screen that had been displayed on the second display prior to the switch from the two-display mode to the one-display mode.

3. The mobile electronic device according to claim 1, wherein the control module is further operable to, when the touch input comprising the predefined touch movement is detected on the first display in the one-display mode and no second screen is stored, cause the first display to display a prescribed screen.

4. The mobile electronic device according to claim 3, wherein the prescribed screen comprises an application startup screen comprising icons for starting up applications.

5. The mobile electronic device according to claim 1, further comprising:
a memory that comprises a first screen memory operable to store the first screen to be displayed by the first display and a second screen memory operable to store the second screen to be displayed by the second display;
wherein the control module is further operable to, when the touch input comprising the predefined touch movement is detected on the first display in the one-display mode, cause the second screen memory to store the first screen stored by the first screen memory to provide a new second screen, and cause the first screen memory to store the second screen stored by the second screen memory to provide a new first screen; and wherein the first display is further operable to display the new first screen after the predefined touch movement is performed.

6. The mobile electronic device according to claim 5, wherein:
the first screen memory is further operable to store a past first screen group that comprises one or more past screens that were displayed by the first display before the first screen is displayed by the first display;
the second screen memory is further operable to store a past second screen group that comprises one or more past screens that were displayed by the second display before the second screen is displayed by the second display;
the mobile electronic device further comprises a return-operation detector operable to detect a return operation to return from a currently displayed screen to a screen displayed in a past; and
the control module is further operable to execute a display process to display, from among the past first screen group stored by the first screen memory, the screen displayed for a longest time before the screen currently displayed by the first display, when the return operation is detected.

7. The mobile electronic device according to claim 6, wherein the control module is further operable to:
when the touch input comprising the predefined touch movement is detected on the first display in the one-display mode, cause the second screen memory to store the past first screen group stored by the first screen memory as a new past second screen group, and the first screen memory to store the past second screen group stored by the second screen memory as a new past first screen group; and,
when the return operation is detected, execute the display process on the first display based on the new past first screen group.

8. The mobile electronic device according to claim 1, further comprising a registration module operable to receive a touch movement from the user, and register the received touch movement as the predefined touch movement.

9. A method for operating a mobile electronic device having a first cabinet comprising a first display, a second cabinet comprising a second display, and a supporting section operable to support the first cabinet and the second cabinet in a manner allowing for switching between a one-display mode in which only the first display is viewable at a time and a two-display mode in which both the first display and the second display are viewable at a time, the method comprising:
storing a first screen to be displayed by the first display and a second screen to be displayed by the second display;
detecting a touch input comprising a predefined touch movement on the first display in the one-display mode; and,
in response to detecting the touch input comprising the predefined touch movement on the first display in the one-display mode, canceling displaying of the first screen on the first display and displaying the second screen on the first display.

10. The method of claim 9, further comprising, when the mobile electronic device is switched from the two-display mode to the one-display mode while a second screen is being displayed on the second display and subsequently the touch input comprising the predefined touch movement is detected on the first display in the one-display mode, causing the first display to display the second screen that had been displayed on the second display prior to the switch from the two-display mode to the one-display mode.

11. The method of claim 9, further comprising, when the touch input comprising the predefined touch movement is detected on the first display in the one-display mode and no second screen is stored, causing the first display to display a prescribed screen.

12. The method of claim 9, wherein the first screen is stored in a first screen memory and the second screen is stored in a second screen memory, the method further comprising, when the touch input comprising the predefined touch movement is detected on the first display in the one-display mode:
storing the first screen in the second screen memory to provide a new second screen;
storing the second screen in the first screen memory to provide a new first screen; and
displaying the new first screen on the first display.

13. The method of claim 12, further comprising:
storing, in the first screen memory, a past first screen group that comprises one or more past screens that were displayed by the first display before the first screen is displayed by the first display,
storing, in the second screen memory, a past second screen group that comprises one or more past screens that were displayed by the second display before the second screen is displayed by the second display;
detecting return operation to return from a currently displayed screen to a screen displayed in a past; and
executing a display process to display, from among the past first screen group stored in the first screen memory, a screen displayed for a longest time before a screen currently displayed by the first display, when the return operation is detected.

14. The method of claim 13, further comprising:
when the touch input comprising the predefined touch movement is detected on the first display in the one-display mode, storing the past first screen group in the second screen memory to provide a new past second screen group and storing the past second screen group in the first screen memory to provide a new past first screen group; and
when the return operation is detected, executing the display process on the first display based on the new past first screen group.

15. The method of claim 9, further comprising:
receiving a touch movement from a user; and
registering the received touch movement as the predefined touch movement.

16. A non-transitory computer readable storage medium comprising computer-executable instructions for operating a mobile electronic device having a first cabinet comprising a first display, a second cabinet comprising a second display, and a supporting section operable to support the first cabinet and the second cabinet in a manner allowing for switching between a one-display mode in which only the first display is viewable at a time and a two-display mode in which both the first display and the second display are viewable at a time, wherein the computer-executable instructions cause the mobile electronic device to:
store a first screen to be displayed by the first display and a second screen to be displayed by the second display;
detect a touch input comprising a predefined touch movement on the first display in the one-display mode; and,
in response to detecting the touch input comprising the predefined touch movement on the first display in the one-display mode, cancel displaying of the first screen on the first display and display the second screen on the first display.

17. The non-transitory computer readable storage medium according to claim 16, wherein the computer-executable instructions further, when the mobile electronic device is switched from the two-display mode to the one-display mode while a second screen is being displayed on the second display and subsequently the touch input comprising the predefined touch movement is detected on the first display in the one-display mode, cause the first display to display the second screen that had been displayed on the second display prior to the switch from the two-display mode to the one-display mode.

18. The non-transitory computer readable storage medium according to claim 16, wherein the computer-executable instructions further, when the touch input comprising the predefined touch movement is detected on the first display in the one-display mode and no second screen is stored, cause the first display to display a prescribed screen.

* * * * *